(12) United States Patent
Hirota et al.

(10) Patent No.: US 9,638,966 B2
(45) Date of Patent: May 2, 2017

(54) LIQUID CRYSTAL DISPLAY DEVICE

(71) Applicant: Japan Display Inc., Tokyo (JP)

(72) Inventors: Takenori Hirota, Tokyo (JP); Osamu Itou, Tokyo (JP)

(73) Assignee: Japan Display Inc., Tokyo (JP)

( * ) Notice: Subject to any disclaimer, the term of this patent is extended or adjusted under 35 U.S.C. 154(b) by 5 days.

(21) Appl. No.: 14/789,312

(22) Filed: Jul. 1, 2015

(65) Prior Publication Data

US 2016/0004130 A1    Jan. 7, 2016

(30) Foreign Application Priority Data

Jul. 2, 2014  (JP) .................................. 2014-136804

(51) Int. Cl.
*G02F 1/1343* (2006.01)

(52) U.S. Cl.
CPC .............................. *G02F 1/134309* (2013.01)

(58) Field of Classification Search
CPC ...... G02F 1/136; G02F 1/1368; G02F 1/1343; G02F 1/134309; G02F 1/136286; G02F 1/134363; G02F 1/1335; G02F 1/133512; G02F 1/134336; G02F 1/133514; G02F 1/136227; G02F 1/133753; G02F 1/133711; G02F 1/1362; G02F 2001/134345; G02F 2001/134372; G02F 2001/134318; G02F 2001/133757; G02F 2001/13685; G02F 2201/40; G02F 2201/52; G02F 2201/122; G02F 2201/123; H01L 27/3248; H01L 27/3262; H01L 27/3211; H01L 27/3276; H01L 29/40; H01L 51/5203; G09G 3/3648; G09G 3/3607; G09G 2300/0426; G09G 2300/0447; G09G 2300/0452; G09G 2300/0439; G09G 2320/0252

USPC ......... 349/43, 139, 138, 106, 144, 123, 110, 349/129, 143, 141, 108, 146; 345/88, 345/103

See application file for complete search history.

(56) References Cited

U.S. PATENT DOCUMENTS 6,266,116 B1 *  7/2001  Ohta ................. G02F 1/134363
                                                  349/141
2005/0140897 A1    6/2005  Kim et al.
(Continued)

FOREIGN PATENT DOCUMENTS

| JP | 2005-196118 A | 7/2005 |
|----|---------------|--------|
| JP | 2009-237541 A | 10/2009 |
| JP | 2012-053137 A | 3/2012 |

*Primary Examiner* — Thoi Duong
(74) *Attorney, Agent, or Firm* — Typha IP LLC

(57) ABSTRACT

To prevent dark unevenness at the corner portion of a screen, a provided is a liquid crystal display including a first pixel formed with a pixel electrode at a first angle in a Y-direction, wherein the pixel electrodes of top, bottom, left, and right adjacent pixels to the first pixel are at a second angle in a Y-direction. The absolute value of the first angle is equal to the absolute value of the second angle, and a sign of the first angle is opposite to a sign of the second angle The rotation direction of a liquid crystal when a voltage is applied to the pixel electrode is in the opposite directions between the adjacent pixels. Thus, it is possible to prevent ions included in the liquid crystal from flowing on the peripheral portion of a display region to prevent dark unevenness at the corner portion of the screen.

9 Claims, 26 Drawing Sheets

(56) References Cited

U.S. PATENT DOCUMENTS

2009/0225267 A1    9/2009   Atarashiya et al.
2012/0050630 A1    3/2012   Sato et al.

\* cited by examiner

LIQUID CRYSTAL DISPLAY DEVICE

CLAIM OF PRIORITY

The present application claims priority from Japanese Patent Application JP 2014-136804 filed on Jul. 2, 2014, the content of which is hereby incorporated by reference into this application.

BACKGROUND OF THE INVENTION (1) Field of the Invention

The present disclosure relates to a display device, and more specifically to a liquid crystal display device in a lateral electric field mode excellent in viewing angle characteristics.

(2) Description of the Related Art

In the liquid crystal display device, a TFT substrate includes a pixel having a pixel electrode, a thin film transistor (a TFT), and the like formed in a matrix configuration, a counter substrate is disposed opposite to the TFT substrate, and a liquid crystal is sandwiched between the TFT substrate and the counter substrate. An image is formed by controlling the optical transmittance of liquid crystal molecules for individual pixels. Since the liquid crystal display device is flat and light-weight, the use is widely spread in various fields. Small-sized liquid crystal display devices are widely used in a mobile telephone, a DSC (Digital Still Camera), and the like.

In the liquid crystal display device, a problem is viewing angle characteristics. An IPS (In Plane Switching) mode is a mode in which liquid crystal molecules are rotated in a direction in parallel with the main surface of a TFT substrate, and viewing angle characteristics are excellent more than in other modes. However, also in the IPS mode, a difference is taken place in the viewing angle characteristics in the azimuth angle direction related to the rotation direction of the liquid crystal molecules.

Japanese Unexamined Patent Application Publication No. 2005-196118 describes a technique in which comb tooth electrodes directed in various directions are formed in a single pixel for aiming to decrease azimuth angle anisotropy. Japanese Unexamined Patent Application Publication No. 2009-237541 describes a technique in which a comb tooth electrode is bent in a single pixel, and the rotation directions of the liquid crystal molecules are varied for aiming to uniformize the viewing angle characteristics. Japanese Unexamined Patent Application Publication No. 2012-53137 describes a technique in which the directions of the slopes of pixel electrodes between pixels adjacent in the vertical direction are in opposite directions for aiming to uniformize the viewing angle characteristics for every two pixels.

SUMMARY OF THE INVENTION

The technique described in Japanese Unexamined Patent Application Publication No. 2009-237541 is the technique in which in the pixel, the pixel electrode is bent to form two regions in which the rotation directions of the liquid crystal molecules are varied. However, ions and impurities included in a liquid crystal (in the following, referred to as ions and the like) flow in a specific direction depending on the direction of an electric field formed by the pixel electrode or a common electrode. The technique described in Japanese Unexamined Patent Application Publication No. 2012-53137 is the technique in which the slopes of the pixel electrodes are varied between the pixels adjacent in the vertical direction. However, also in this case, the same thing is applied in which ions and the like included in a liquid crystal flow in a specific direction depending on the direction of an electric field formed by the pixel electrode or the common electrode.

As described above, when a phenomenon in which ions and the like in a liquid crystal flow in a specific direction is taken place, dark unevenness is produced specifically on the corner portion of the display region depending on the direction in which ions and the like flow because of the accumulation of ions and the like. FIG. 28 is an example in which ions and the like flow in the direction diagonally above in a display region because of the shape of a pixel electrode, and are accumulated on the corner portion diagonally above, and dark unevenness is produced. In FIG. 28, a liquid crystal is sandwiched between a TFT substrate and a counter substrate, and a part of the TFT substrate is formed into a terminal portion. This is an example in which in the case where ions and the like flow in the direction of an arrow 40 in the display region in FIG. 28, dark unevenness is produced on the upper right corner portion of the display region. On the other hand, FIG. 29 is an example in which in the case where a pixel electrode is different from the case in FIG. 28, ions and the like flow in the direction diagonally below in the display region and are accumulated on the corner portion diagonally below, and dark unevenness is produced diagonally below in the display region.

It is an object of the present disclosure to prevent dark unevenness on the peripheral portion of the display region, more specifically on the corner portion caused by the accumulation of ions and the like in a liquid crystal display device in the IPS mode having a pixel that aims to provide the uniformity of the viewing angle in the azimuth angle direction.

The present disclosure is to overcome the problems, and the following is specific schemes.

(1) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel is formed with a pixel electrode at a first angle in the second direction; and pixel electrodes of top, bottom, left, and right adjacent pixels to the first pixel are at a second angle in the second direction, an absolute value of the first angle is equal to an absolute value of the second angle, and a sign of the first angle is opposite to a sign of the second angle.

(2) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel is formed with a pixel electrode bent in a projection in the first direction; and pixel electrodes of top, bottom, left, and right adjacent pixels to the first pixel are formed with a pixel electrode bent in a projection in a direction opposite to the first direction.

(3) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel set is formed of a plurality of pixels having a pixel electrode at a first angle in the second direction; and a set of top, bottom, left, and right adjacent pixels to the first pixel set is formed of a plurality of pixels having a pixel electrode at a second angle in the second direction, an absolute value of the first angle is equal to an absolute value of the second angle, and a sign of the first angle is opposite to a sign of the second angle.

(4) In the liquid crystal display device according to (3), the pixel set is configured of three pixels adjacent in a lateral direction.

(5) In the liquid crystal display device according to (3), the pixel set is configured of four pixels adjacent in a lateral direction.

(6) In the liquid crystal display device according to (3), the pixel set is configured of four pixels adjacent in top, bottom, left, and right directions.

(7) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel set is formed of a plurality of pixels having a pixel electrode bent in a projection in the first direction; and a set of top, bottom, left, and right adjacent pixels to the first pixel set is formed of a plurality of pixels having a pixel electrode bent in a projection in a direction opposite to the first direction.

(8) In the liquid crystal display device according to (7), the pixel set is configured of three pixels adjacent in a lateral direction.

(9) In the liquid crystal display device according to (7), the pixel set is configured of four pixels adjacent in a lateral direction.

(10) In the liquid crystal display device according to (7), the pixel set is configured of four pixels adjacent in top, bottom, left, and right directions.

(11) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel in a first row is formed with a pixel electrode at a first angle in the second direction; a pixel adjacent to the first pixel in a lateral direction is formed with a pixel electrode at a second angle in the second direction, and in the pixel electrode, an absolute value of the first angle is equal to an absolute value of the second angle, and a sign of the first angle is opposite to a sign of the second angle; a second pixel in a second row adjacent in a vertical direction of the first row is formed with a pixel electrode at a first angle in the second direction; a pixel adjacent to the second pixel in a lateral direction is formed with a pixel electrode at a second angle in the second direction, and in the pixel electrode, an absolute value of the first angle is equal to an absolute value of the second angle, and a sign of the first angle is opposite to a sign of the second angle; and the first pixel and the second pixel are displaced in the first direction by a half of a pitch of the pixel in the first direction.

(12) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel in a first row is formed with a pixel electrode in a projection in the first direction; a pixel adjacent to the first pixel in a lateral direction is formed with a pixel electrode bent in a projection in a direction opposite to the first direction; a second pixel in a second row adjacent in a vertical direction of the first row is formed with a pixel electrode in a projection in the first direction; a pixel adjacent to the second pixel in a lateral direction is formed with a pixel electrode bent in a projection in a direction opposite to the first direction; and the first pixel and the second pixel are displaced in the first direction by a half of a pitch of the pixel in the first direction.

(13) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a common electrode of a first pixel is formed with a slit at a first angle in the second direction; and slits of common electrodes of top, bottom, left, and right adjacent pixels to the first pixel are at a second angle in the second direction, an absolute value of the first angle is equal to an absolute value of the second angle, and a sign of the first angle is opposite to a sign of the second angle.

(14) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a common electrode of a first pixel is formed with a slit bent in a projection in the first direction; and common electrodes of top, bottom, left, and right adjacent pixels to the first pixel are formed with a slit bent in a projection in a direction opposite to the first direction.

(15) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel set is formed of a plurality of pixels having a common electrode formed with a slit at a first angle in the second direction; and a set of top, bottom, left, and right adjacent pixels to the first pixel set is formed of a plurality of pixels having a common electrode formed with a slit at a second angle in the second direction, an absolute value of the first angle is equal to an absolute value of the second angle, and a sign of the first angle is opposite to a sign of the second angle.

(16) In the liquid crystal display device according to (15), the pixel set is configured of three pixels adjacent in a lateral direction.

(17) In the liquid crystal display device according to (15), the pixel set is configured of four pixels adjacent in a lateral direction.

(18) In the liquid crystal display device according to (15), the pixel set is configured of four pixels adjacent in top, bottom, left, and right directions.

(19) A liquid crystal display device including: a TFT substrate including a scanning line extended in a first direction and arrayed in a second direction at a right angle to the first direction, a picture signal line extended in the second direction and arrayed in the first direction, and a pixel formed between the scanning line and the picture signal line; a counter substrate; and a liquid crystal sandwiched between the TFT substrate and the counter substrate. In the liquid crystal display device, a first pixel set is formed of a plurality of pixels having a common electrode formed with a slit bent in a projection in the first direction; and a set of top, bottom, left, and right adjacent pixels to the first pixel set is formed of a plurality of pixels having a common electrode formed with a slit bent in a projection in a direction opposite to the first direction.

(20) In the liquid crystal display device according to (19), the pixel set is configured of three pixels adjacent in a lateral direction.

(21) In the liquid crystal display device according to (19), the pixel set is configured of four pixels adjacent in a lateral direction.

(22) In the liquid crystal display device according to (19), the pixel set is configured of four pixels adjacent in top, bottom, left, and right directions.

It is noted that although the picture signal line sometimes forms a predetermined angle in the second direction in the individual pixels, the picture signal line is extended in the second direction with no difference in the overall display region.

DETAILED DESCRIPTION OF THE PREFERRED EMBODIMENTS

Figure 1:
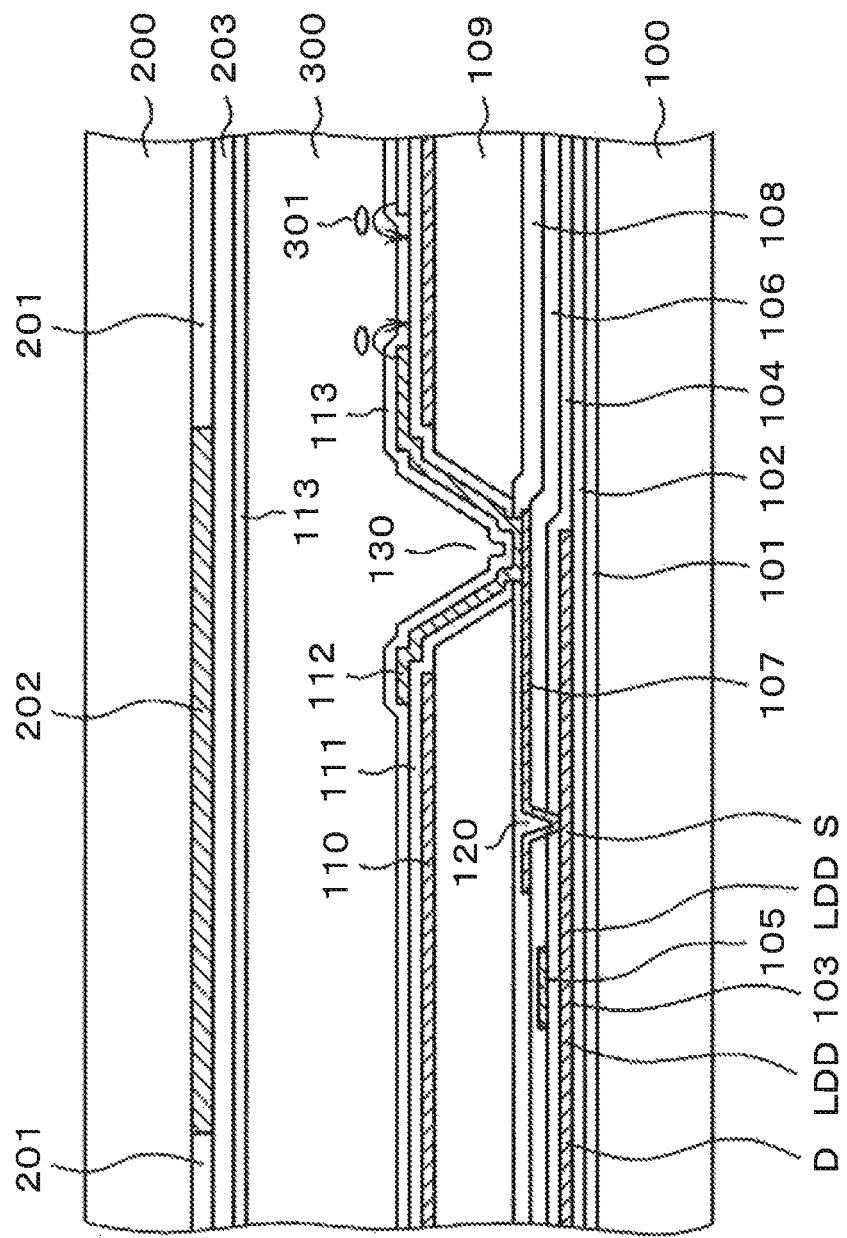
FIG. 1 is a cross sectional view of a liquid crystal display device in an IPS mode.

Prior to describing specific pixel structures according to the present disclosure, the structure of a liquid crystal display device to which the present disclosure is applied will be described. FIG. 1 is a cross sectional view of a liquid crystal display device to which the present disclosure is applied. A TFT in FIG. 1 is a so-called top gate TFT, and for a semiconductor to be used, an LTPS (Low Temperature Poli-Si) semiconductor is used. On the other hand, in the case where an a-Si semiconductor is used, a so-called bottom gate TFT is often used. In the following description, a description will be made as the case of using a top gate TFT is taken as an example. However, the present disclosure is also applicable to the case of using a bottom gate TFT.

In FIG. 1, a first base film 101 formed of SiN and a second base film 102 formed of SiO2 are formed on a glass substrate 100 by CVD (Chemical Vapor Deposition). The roles of the first base film 101 and the second base film 102 are to prevent impurities produced from the glass substrate 100 from contaminating a semiconductor layer 103.

The semiconductor layer 103 is formed on the second base film 102. This semiconductor layer 103 is a layer that an a-Si film is formed on the second base film 102 by CVD and the a-Si film is subjected to laser annealing and converted into a poly-Si film. The poly-Si film is patterned by photolithography.

A gate insulating film 104 is formed on the semiconductor layer 103. This gate insulating film 104 is an SiO$_2$ film formed of TEOS (tetraethoxysilane). This film is also formed by CVD. A gate electrode 105 is formed on the gate insulating film 104. A scanning line 10 illustrated in FIG. 2 also serves as the gate electrode 105. The gate electrode 105 is formed of a MoW film, for example. When it is necessary to decrease the resistance of the gate electrode 105 or the scanning line 10, an Al alloy is used.

The gate electrode 105 is patterned by photolithography. In this patterning, an impurity such as phosphorus and boron is doped to the poly-Si layer by ion implantation, and a source S or a drain D is formed on the poly-Si layer. Moreover, using the photoresist of the gate electrode 105 in patterning, a LDD (Lightly Doped Drain) layer is formed between a channel layer and the source S or the drain D on the poly-Si layer.

After the formation, a first interlayer insulating film 106 is formed using SiO$_2$ to cover the gate electrode 105. The first interlayer insulating film 106 is formed to insulate the gate electrode 105 from a contact electrode 107. On the first interlayer insulating film 106 and the gate insulating film 104, a contact hole 120 is formed that connects a source portion S of the semiconductor layer 103 to the contact electrode 107. Photolithography for forming the contact hole 120 on the first interlayer insulating film 106 and the gate insulating film 104 is performed simultaneously.

The contact electrode 107 is formed on the first interlayer insulating film 106. The contact electrode 107 is connected to a pixel electrode 112 through a contact hole 130. The drain D of the TFT is connected to a picture signal line 20 illustrated in FIG. 2 through the through hole at a portion not illustrated.

The contact electrode 107 and the picture signal line are simultaneously formed on the same layer. The contact electrode 107 and the picture signal line (in the following, represented by the contact electrode 107) use an AlSi alloy, for example, for decreasing resistance. Since the AlSi alloy causes a hillock, or Al spreads to the other layers, such a structure is provided in which AlSi is sandwiched using a MoW barrier layer and a cap layer, for example, not illustrated.

An inorganic passivation film (an insulating film) 108 is applied to cover the contact electrode 107 for protecting the entire TFT. The inorganic passivation film 108 is formed by CVD similarly to the first base film 101. An organic passivation film 109 is formed to cover the inorganic passivation film 108. The organic passivation film 109 is formed of a photosensitive acrylic resin. The organic passivation film 109 can be formed of a silicone resin, epoxy resin, polyimide resin, and the like in addition to an acrylic resin. Since the organic passivation film 109 serves as a planarization film, the organic passivation film 109 is formed thick. Although the film thickness of the organic passivation film 109 ranges from 1 to 4 μm, and in many cases, the film thickness is about 2 μm.

In order to provide conduction between the pixel electrode 120 and the contact electrode 107, the through hole 130 is formed on the inorganic passivation film 108 and the organic passivation film 109. For the organic passivation film 109, a photosensitive resin is used. After the application of a photosensitive resin, when this resin is exposed, only portions to which light is applied are dissolved in a certain developer. In other words, with the use of a photosensitive resin, the formation of a photoresist can be omitted. After the through hole 130 is formed on the organic passivation film 109, the organic passivation film is burned at a temperature of about 230° C., and the organic passivation film 109 is completed.

After the completion, ITO (Indium Tin Oxide) to be a common electrode 110 is formed by sputtering, and patterned so as to remove ITO from the through hole 130 and the peripheral portion of the through hole 130. The common electrode 110 can be formed in a flat surface in common in the pixels. After the formation, SiN to be a second interlayer insulating film 111 is formed throughout the surface by CVD. After the formation, in the through hole 130, a through hole that provides conduction between the contact electrode 107 and the pixel electrode 112 is formed on the second interlayer insulating film 111 and the inorganic passivation film 108.

Figure 2:
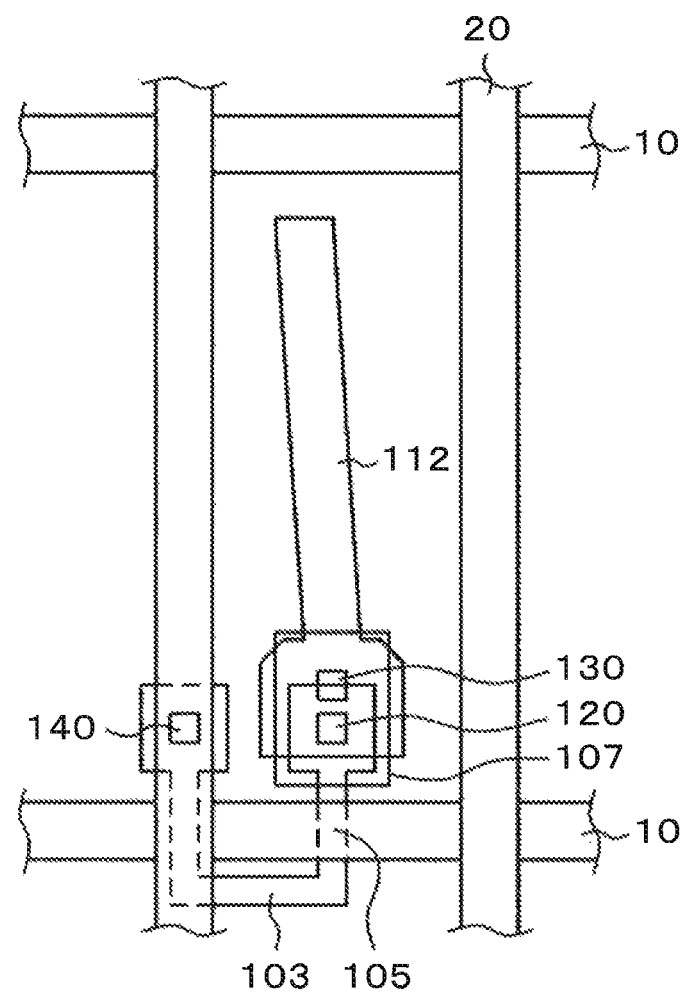
FIG. 2 is a plan view of a pixel electrode according to a first embodiment.

After the formation, ITO is formed by sputtering and patterned, and the pixel electrode 112 is formed. The plane form of the pixel electrode 112 according to the present disclosure is illustrated in FIG. 2 and diagrams later. An alignment film material is applied on the pixel electrode 112 by flexographic printing, ink jet printing, or the like and burned, and an alignment film 113 is formed. For the alignment process of the alignment film 113, photo-alignment with polarized ultraviolet rays is used as well as a rubbing method.

When a voltage is applied across the pixel electrode 112 and the common electrode 110, an electric line of force is produced as illustrated in FIG. 1. This electric field rotates liquid crystal molecules 301, the light quantity passed through a liquid crystal layer 300 is controlled for the individual pixels, and an image is formed.

In FIG. 1, a counter substrate 200 is disposed as the liquid crystal layer 300 is sandwiched. A color filter 201 is formed on the inner side of the counter substrate 200. The color filter 201 is formed with red, green, and blue color filters for the individual pixels, and a color image is formed using the filters. A black matrix 202 is formed between the color filter 201 and the color filter 201 to improve the contrast of the image. It is noted that the black matrix 202 also serves as the light shielding film of the TFT, and prevents a photocurrent from being carried through the TFT.

An overcoat film 203 is formed to cover the color filter 201 and the black matrix 202. Since the surfaces of the color filter 201 and the black matrix 202 have irregularities, the surfaces are flattened with the overcoat film 203. On the overcoat film, an alignment film 113 is formed to determine the initial orientation of the liquid crystal. Similarly to the alignment film 113 on the TFT substrate 100 side, a rubbing method or a photo-alignment method is used for the alignment process of the alignment film 113.

It is noted that the configuration described above is an example. For example, in some cases, the inorganic passivation film 108 is not formed on the TFT substrate 100 depending on types. Moreover, in some cases, the forming process of the through hole 130 is also different depending on types.

Furthermore, FIG. 1 is an example in the case where the pixel electrode is provided on the top side in which the pixel electrode 112 is provided above the common electrode 110. On the other hand, as described later, there is also a type in which the common electrode is provided on the top side where the common electrode 110 is provided on the upper side of the pixel electrode 112. The present disclosure is also applicable to the case where the common electrode is provided on the top side. In the following, the present disclosure will be described in detail with reference to the embodiments.

First Embodiment

FIG. 2 is a plan view of the configuration of a pixel. In FIG. 2, the scanning lines 10 are extended in the lateral direction, and arrayed in the vertical direction. The picture signal lines 20 are extended in the vertical direction, and arrayed in the lateral direction. The pixel electrode 112 exists on a region surrounded by the scanning line 10 and the picture signal line 20. In FIG. 2, the semiconductor layer 103 is extended under the picture signal line 20, and passed under the scanning line 10 twice. The TFT is formed on the portion where the semiconductor layer is passed under the scanning line. In other words, the scanning line serves as the gate electrode 105 on this portion. A picture signal is supplied to the semiconductor layer 103 through the third through hole 140.

After the semiconductor layer 103 is passed under the scanning line, the semiconductor layer 103 is connected to the contact electrode 107 through the first through hole 120. The contact electrode 107 is connected to the pixel electrode 112 through the second through hole 130. In FIG. 2, the pixel electrode 112 has a slope in the direction at a right angle to the extending direction of the scanning line 10. This is because the rotation directions of the liquid crystal molecules are unified in the case where the orientation direction of the liquid crystal is set to the extending direction of the scanning line 10 or to the direction at a right angle to the extending direction of the scanning line. It is noted that the orientation direction of the liquid crystal is the direction at a right angle to the extending direction of the scanning line 10 in the case where the dielectric anisotropy of the liquid crystal is positive, and the orientation direction is the extending direction of the scanning line 10 in the case where the dielectric anisotropy of the liquid crystal is negative.

Figure 3:
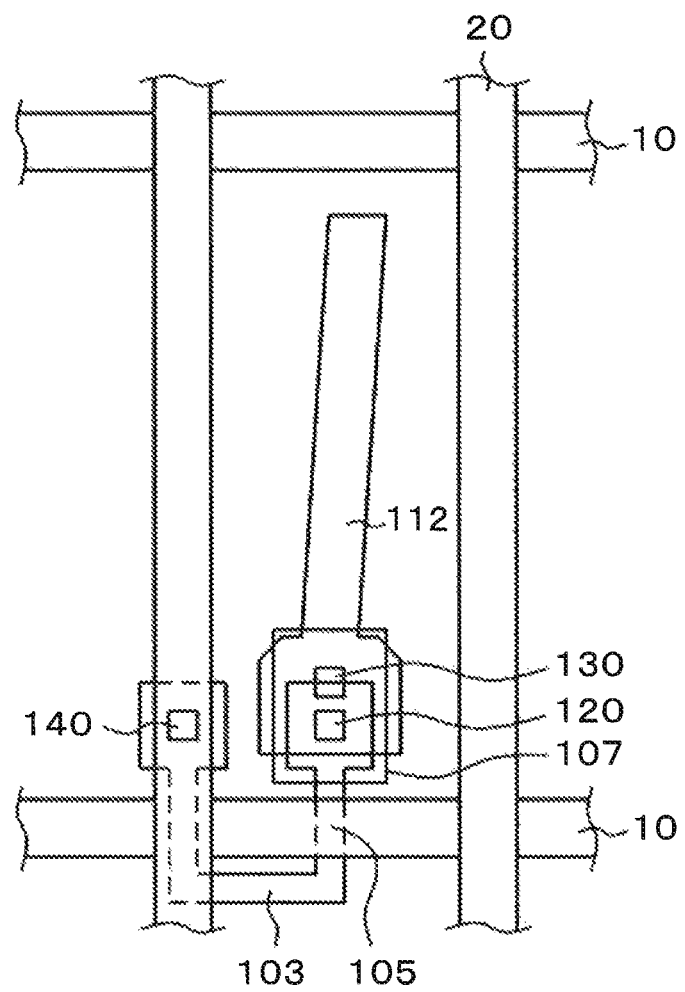
FIG. 3 is a plan view of another pixel electrode according to the first embodiment.

FIG. 3 is the case where the direction of the slope of the pixel electrode 112 is opposite in the case illustrated in FIG. 2. In FIG. 3, when a voltage is applied to the pixel electrode 112, the rotation direction of the liquid crystal molecules is opposite in the case illustrated in FIG. 2. The other configurations are similar in the description in FIG. 2.

Figure 4:
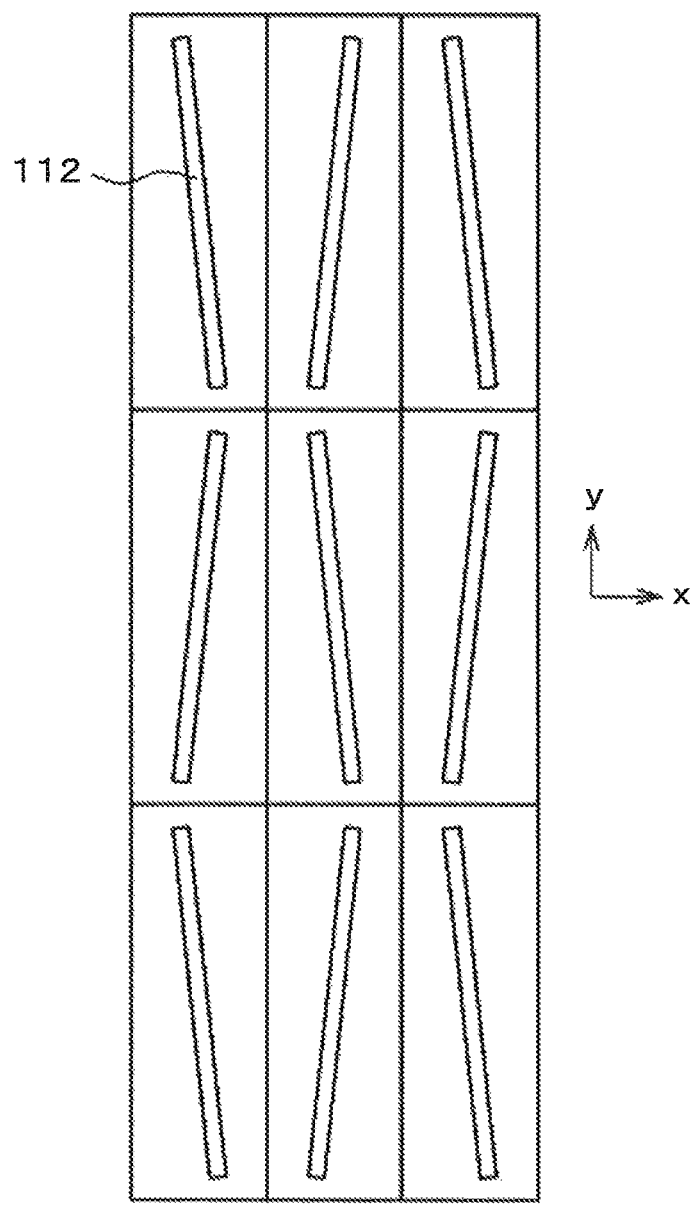
FIG. 4 is a plan view of the disposition of pixel electrodes according to the first embodiment.

FIG. 4 is a plan view of the disposition of pixels according to the embodiment. FIG. 4 is pixels in a three by three matrix. Moreover, a stripe in the pixel is the pixel electrode 112. For easy understanding, the other configurations in the pixel are omitted. When attention is paid for the pixel electrode 112 in the center pixel in FIG. 4, the slopes to the Y-axis direction of the pixel electrodes 112 of upper, lower, left, and right pixels adjacent to this pixel are in the opposite directions to the slope to the Y-axis direction of the pixel electrode 112 of the pixel. Therefore, in the case where a voltage is applied to the pixel electrode 112, the rotation direction of the liquid crystal molecules in the pixel is opposite to the rotation direction of the liquid crystal molecules in the upper, lower, left, and right pixels adjacent to the pixel. This is similarly applied to all the pixels as well as the center pixel in FIG. 4. In other words, since the rotation directions of the liquid crystal molecules are opposite to each other for the individual adjacent pixels, in the overall display region, a flow of the liquid crystal or a flow of ions and the like included in the liquid crystal is not produced in the specific direction.

Figure 5:
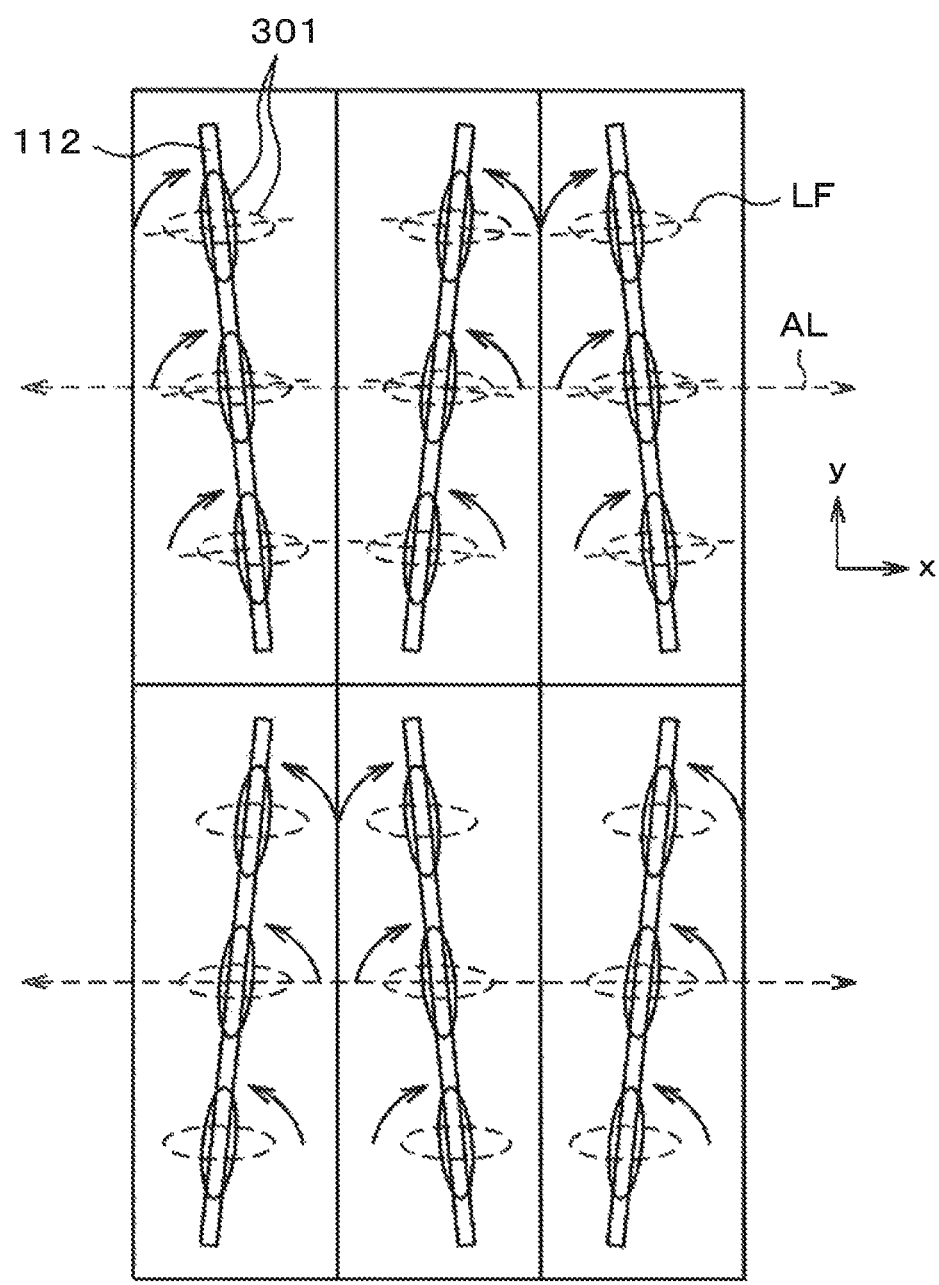
FIG. 5 is a schematic plane view of the operation according to the first embodiment.

FIG. 5 is a schematic plane view of the rotation direction of the liquid crystal molecules 301 corresponding to FIG. 4. The case in FIG. 5 is the case where the liquid crystal molecules 301 have a negative dielectric anisotropy. In FIG. 5, a dotted arrow AL depicts the alignment direction of the alignment film. The long axis of the liquid crystal molecules 301 depicted by a dotted line is initially aligned in the direction AL. When a voltage is applied to the pixel electrode 112, an electric field is directed in the direction of a dotted line denoted by LF, and the long axis of the liquid crystal molecules 301 is rotated in the direction at a right angle to LF. This is because the liquid crystal molecules 301 have a negative dielectric anisotropy.

In FIG. 5, the slopes of the pixel electrodes 112 adjacent in the lateral direction are opposite to each other in the Y-axis direction. Therefore, the rotation directions of the liquid crystal molecules 301 in the case where a voltage is applied to the pixel electrode 112 are in the opposite directions to each other in the left and right adjacent pixels. Moreover, even in the upper and lower adjacent pixels, the slopes to the Y-axis direction of the pixel electrodes 112 are in the opposite directions. Therefore, the rotation directions of the liquid crystal molecules 301 in the case where a voltage is applied to the pixel electrode 112 are in the opposite directions to each other in the upper and lower adjacent pixels. Therefore, in the case where the overall display region is considered, a flow of the liquid crystal or a flow of impurities and the like included in the liquid crystal is not produced. As described above, according to the present disclosure, it is possible to prevent a phenomenon in which impurities, ions, and the like included in the liquid crystal are accumulated on the peripheral portion of the display region or the corner portion of the display region to produce dark unevenness.

Figure 6:
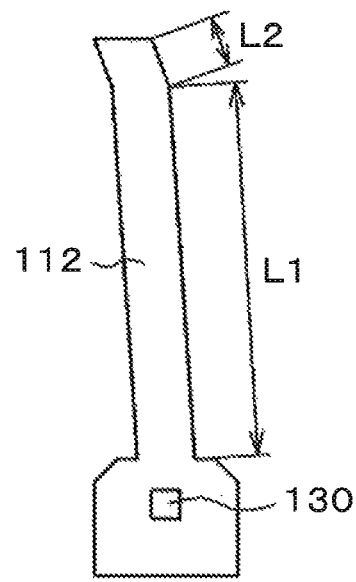
FIG. 6 is a plan view of another pixel electrode.

Meanwhile, a region, a so-called domain, is sometimes produced in which the rotation direction of the liquid crystal is in the opposite direction in a part of the display ration caused by the shape of the pixel electrode 112 of the liquid crystal display device. In order to prevent the production of this domain, the portion near the tip end is sometimes bent in the pixel electrode 112. FIG. 6 is a plan view of a pixel electrode having this bent portion. In FIG. 6, the length of the pixel electrode 112 in a stripe is defined as L1, and the tip end is bent along a length L2. The slope of the pixel electrode 112 means the slope of the portion in the length L1 of a stripe. It is noted that in the present specification, the pixel electrode in a stripe is also referred to as a comb tooth electrode.

Figure 7:
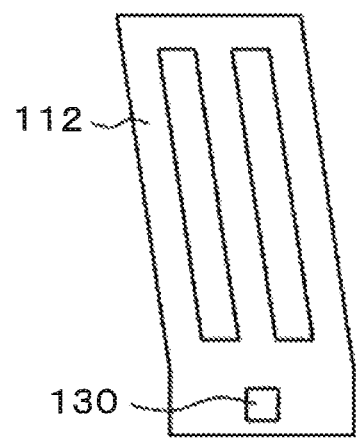
FIG. 7 is a plan view of still another pixel electrode.
Figure 8:
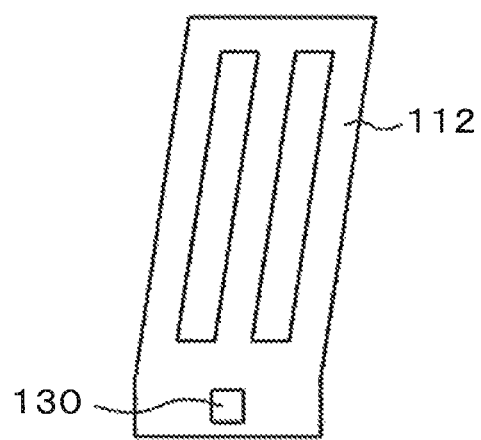
FIG. 8 is a plan view of yet another pixel electrode.

In the description above, the case is described where the pixel electrode 112 is a comb tooth electrode with one tooth. However, the present disclosure is not limited to this, and is applicable to the cases of various types of the pixel electrodes 112. FIGS. 7 and 8 are the case where a pixel electrode 112 is configured of a comb tooth electrode with three teeth. FIG. 7 is the case where a pixel electrode 112 is tilted in the direction the same as in FIG. 2, and FIG. 8 is the case where a pixel electrode 112 is tilted in the direction the same as in FIG. 3. The pixel electrodes 112 illustrated in FIGS. 7 and 8 are arrayed in accordance with FIG. 4, so that it is possible to prevent the liquid crystal, or impurities, ions, and the like included in the liquid crystal from flowing in a certain direction, and it is possible to prevent dark unevenness on the corner portion and the like of the display region.

Figure 9:
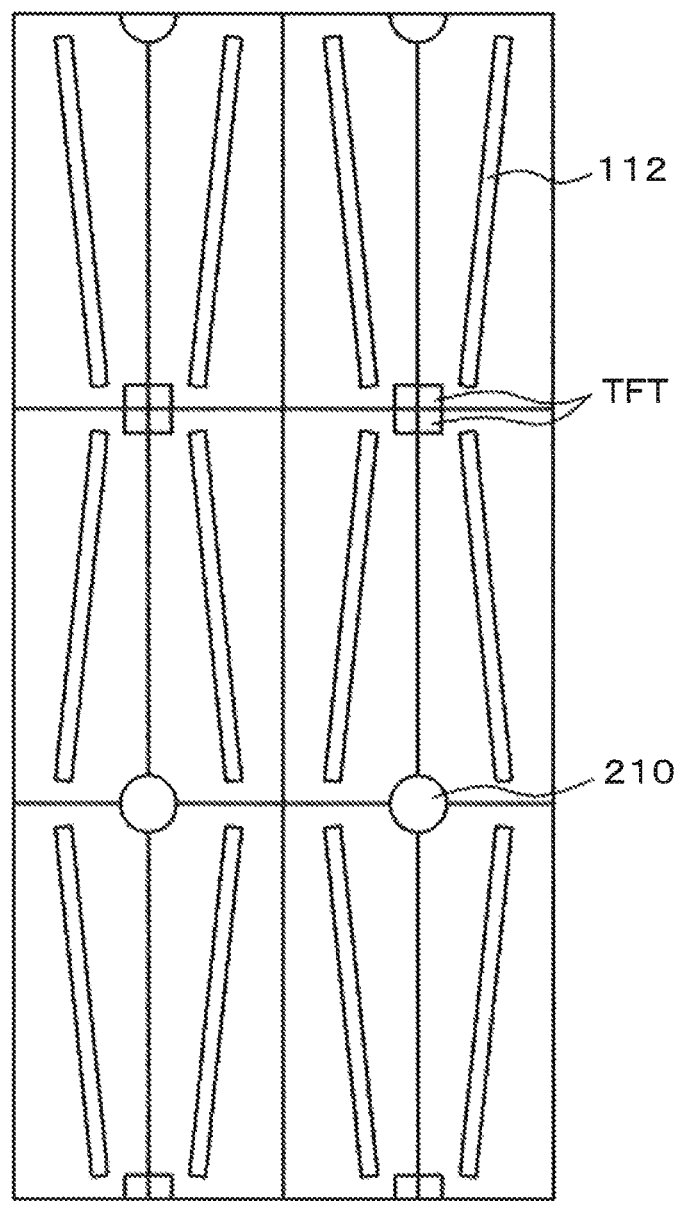
FIG. 9 is a plan view of the disposition of pixel electrodes, TFTs, and columnar spacers.
Figure 10:
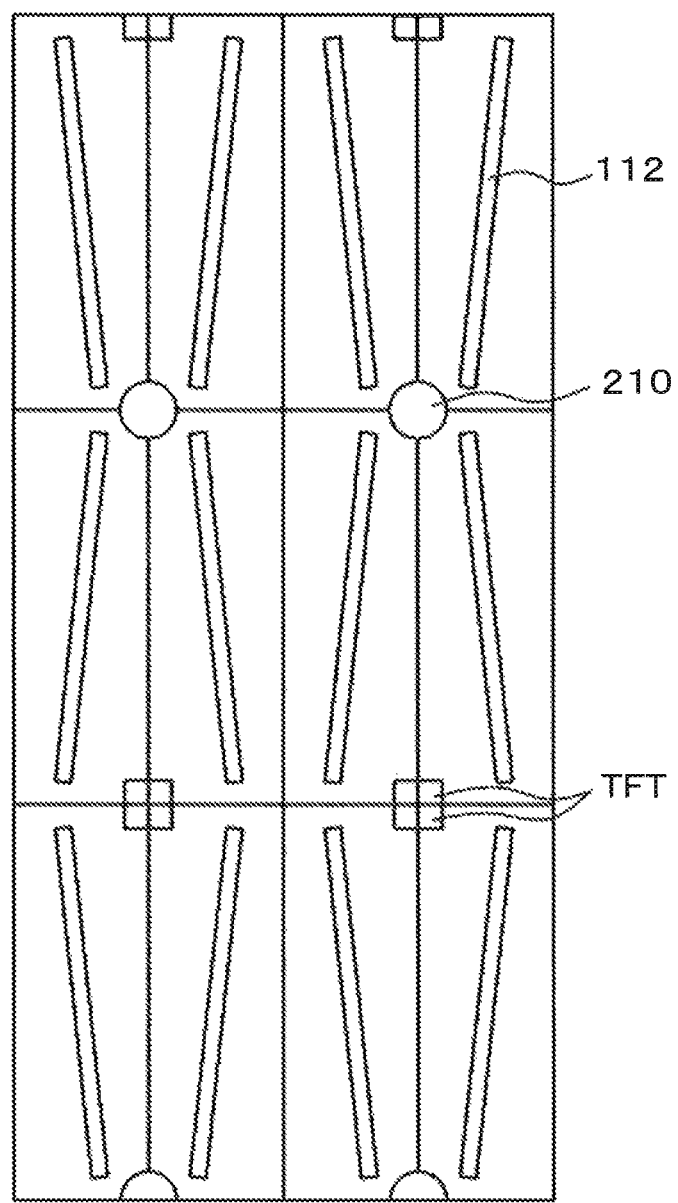
FIG. 10 is another plan view of the disposition of pixel electrodes, TFTs, and columnar spacers.

FIGS. 9 to 12 are plan views of an example of the disposition of the pixel electrodes 112, the TFTs, and columnar spacers 210. FIG. 9 is an example in which the TFTs of four pixels are gathered on the adjacent corner portions and the columnar spacer 210 is disposed on the corner portions on which the TFTs do not exist. FIG. 10 is an example in the case where the positions of the TFT and the columnar spacer are replaced in the case in FIG. 9. In both cases, the present disclosure can be applied with no problem.

Figure 11:
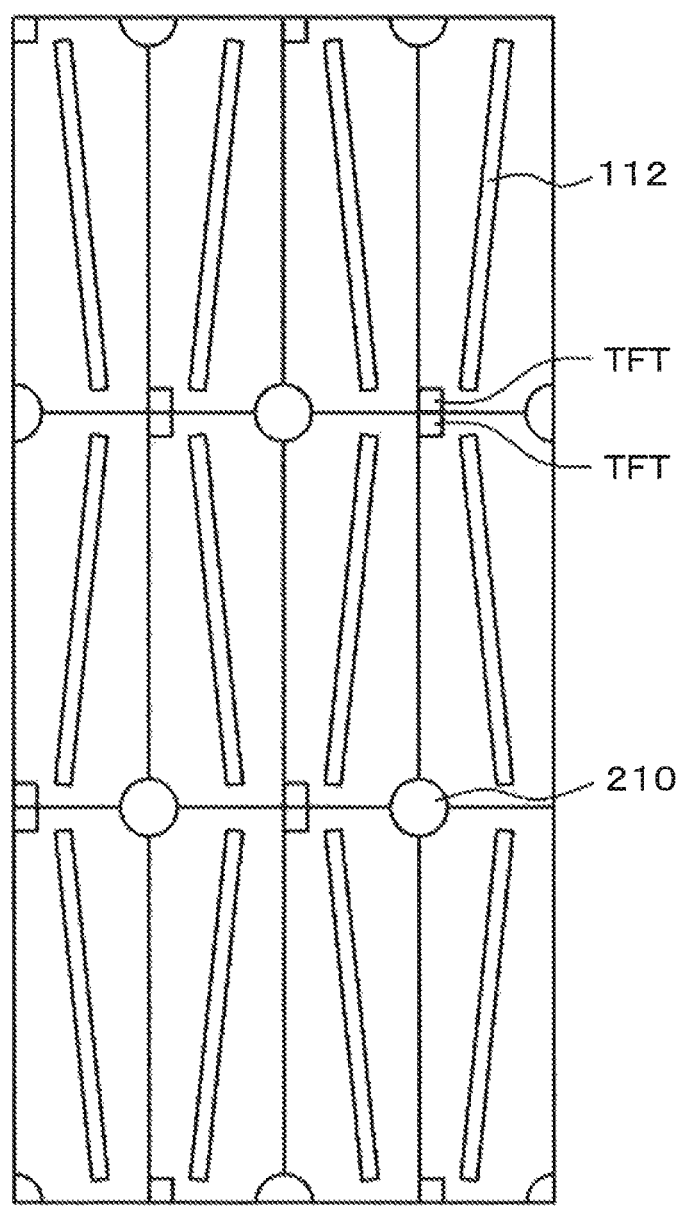
FIG. 11 is still another plan view of the disposition of pixel electrodes, TFTs, and columnar spacers.
Figure 12:
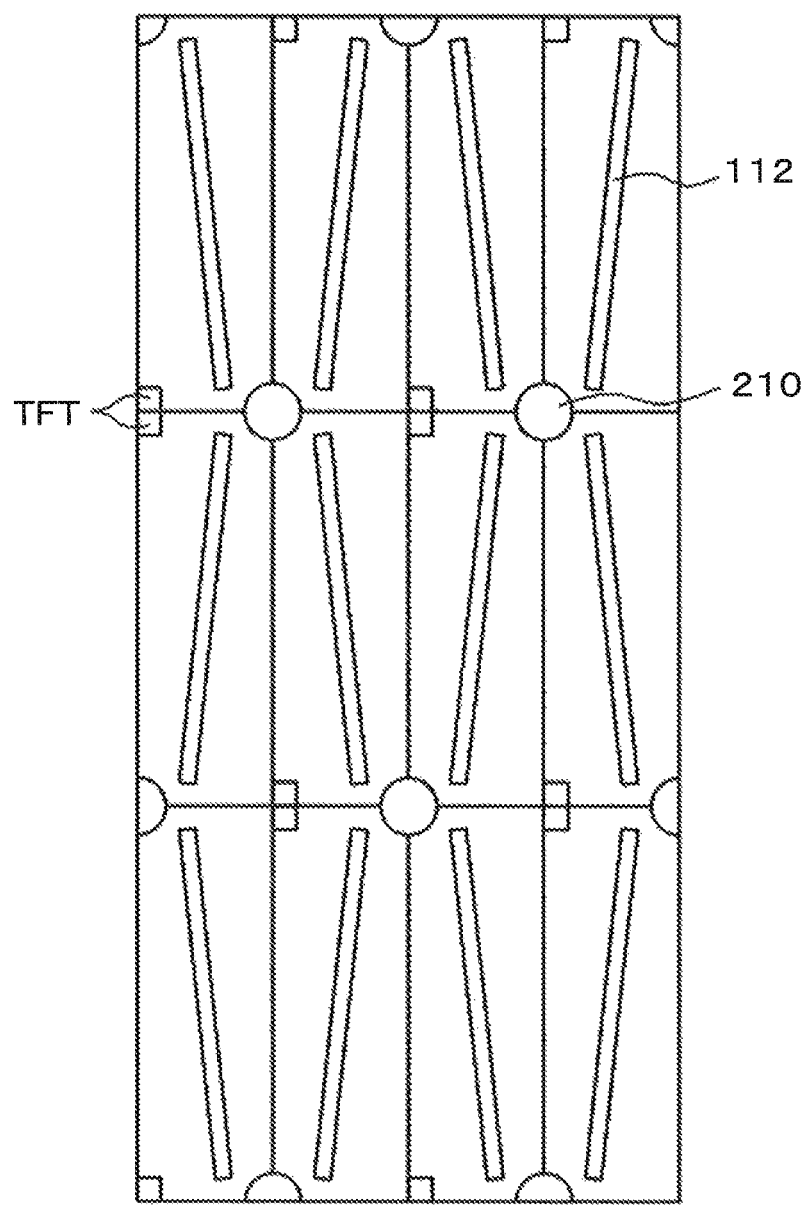
FIG. 12 is yet another plan view of the disposition of pixel electrodes, TFTs, and columnar spacers.

FIG. 11 is an example in which the TFTs of two upper and lower pixels are disposed on the adjacent corner portions and the columnar spacer 210 is disposed on the other corner portions. In FIG. 11, the TFT and the columnar spacer 210 are alternately disposed. FIG. 12 is an example in which the position of the TFT and the position of the columnar spacer are replaced in the case in FIG. 11. In both cases, the present disclosure can be applied with no problem.

Second Embodiment

Figure 13:
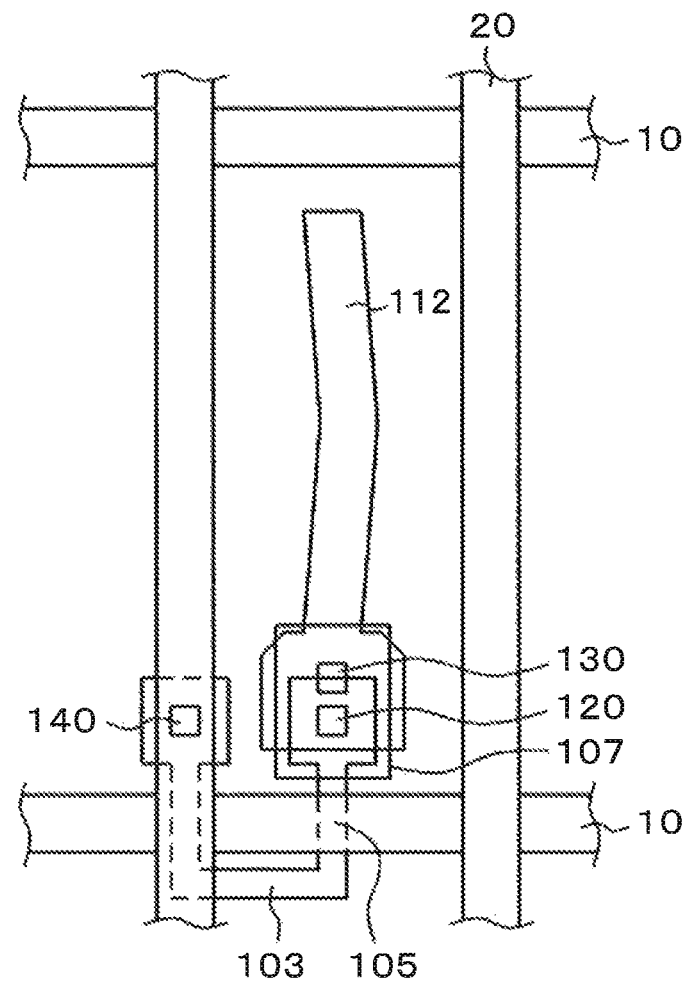
FIG. 13 is a plan view of a pixel electrode according to a second embodiment.
Figure 14:
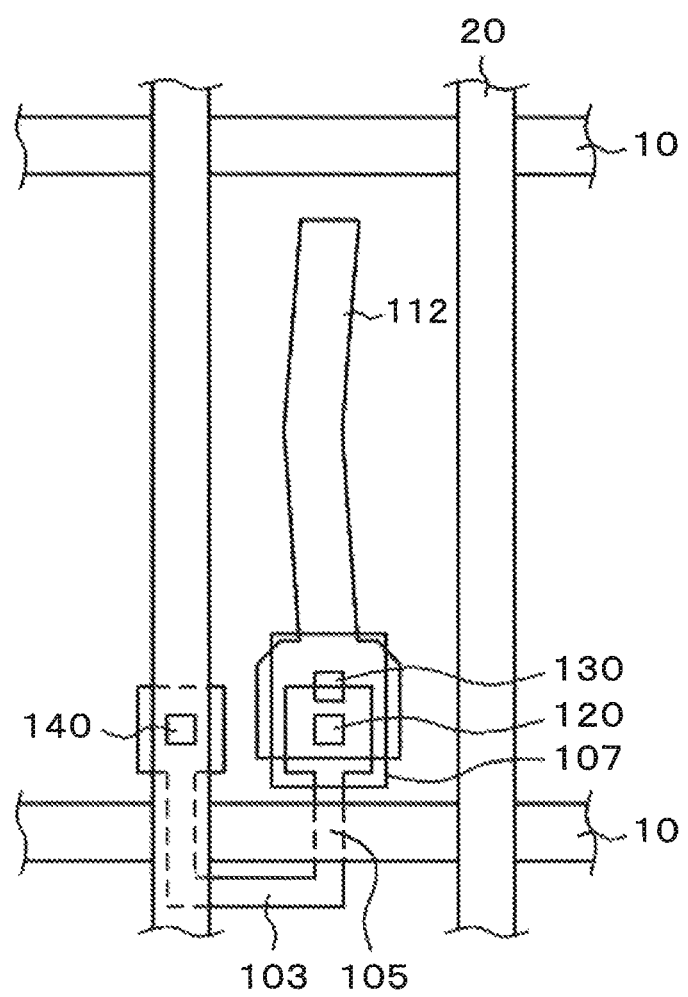
FIG. 14 is a plan view of another pixel electrode according to the second embodiment.

FIG. 13 is a plan view of the shape of another pixel electrode 112 according to the present disclosure. In FIG. 13, the pixel electrode 112 is bent near the center. Therefore, the rotation direction of the liquid crystal molecules 301 in the case where a voltage is applied to the pixel electrode 112 is opposite between the portion close to the TFT side from the bent portion of the pixel electrode 112 and the portion far from the TFT side beyond the bent portion. In other words, in the configuration in FIG. 13, the dependence of the viewing angle on the azimuth angle can be compensated in a single pixel. In FIG. 14, although the bending direction of the pixel electrode 112 is opposite to the bending direction in FIG. 13, it is the same as in FIG. 13 that the dependence of the viewing angle on the azimuth angle can be compensated in a single pixel.

In the pixels illustrated in FIGS. 13 and 14, since the rotation direction of the liquid crystal molecules 301, that is, the domain is different in the upper half and lower half of the pixel, the mode is called a dual domain mode. In contrast to this, the mode in which the dependence of the viewing angle on the azimuth angle is compensated by making the rotation direction of the liquid crystal molecules 301 opposite in two upper and lower adjacent pixels as described earlier is called a pseudo dual domain mode.

Figure 15:
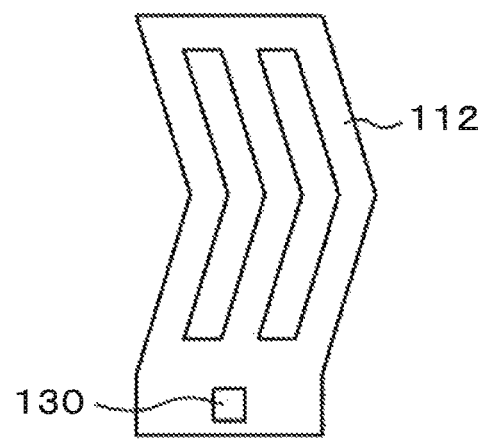
FIG. 15 is a plan view of still another pixel electrode according to the second embodiment.
Figure 16:
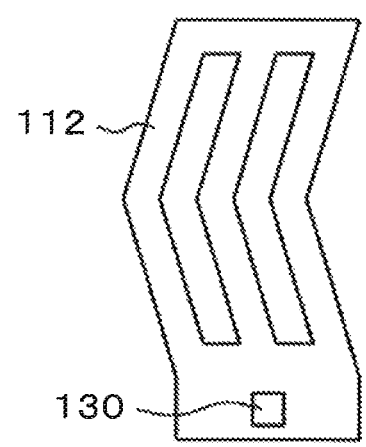
FIG. 16 is a plan view of yet another pixel electrode according to the second embodiment.

FIGS. 13 and 14 are examples in which the dual domain is feasible in the case where the pixel electrode 112 is configured of a comb tooth electrode with one tooth. There are various types of the pixel electrodes 112 that can realize the dual domain. FIGS. 15 and 16 are examples in which pixel electrodes 112 are configured of a comb tooth electrode with three teeth. In the case in FIG. 15, the rotation direction of the liquid crystal molecules 301 in the case where a voltage is applied to the pixel electrode 112 corresponds to the case in FIG. 13. Moreover, in the case in FIG. 16, the rotation direction of the liquid crystal molecules 301 in the case where a voltage is applied to the pixel electrode 112 corresponds to the case in FIG. 14.

Figure 17:
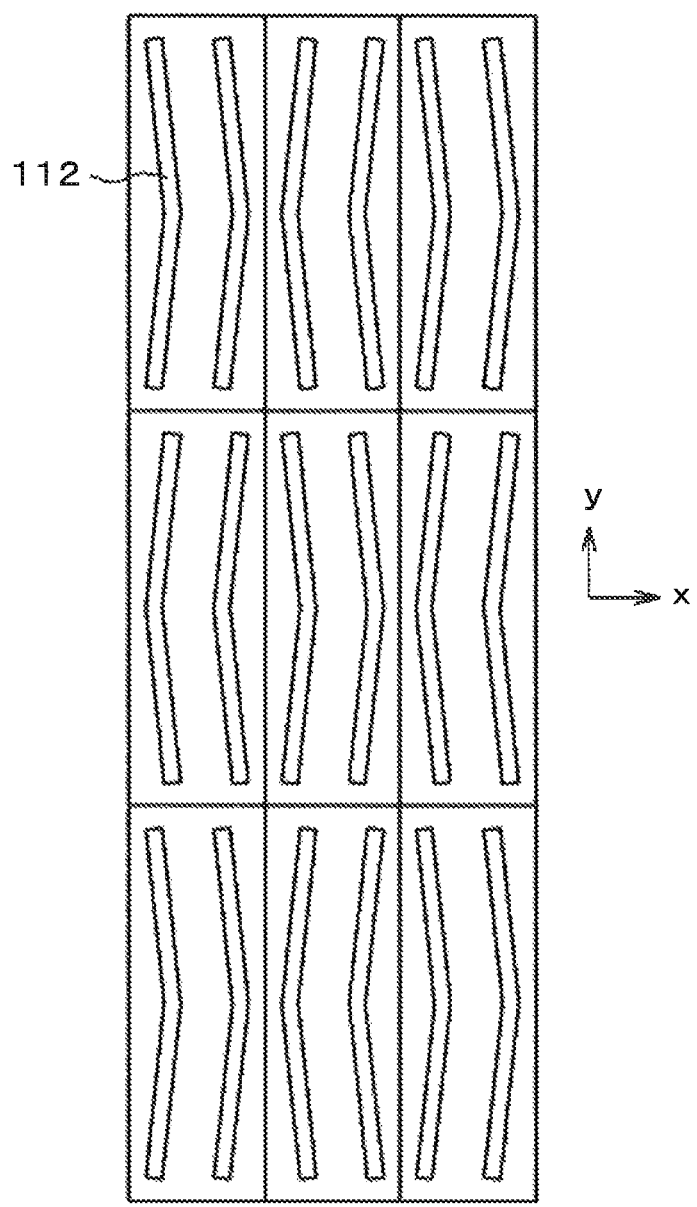
FIG. 17 is a plan view of the disposition of the pixel electrodes according to the second embodiment.

It may be fine that the comb tooth electrode of the pixel electrode 112 is not limited to the case of one comb tooth or three comb teeth and the comb tooth electrode has a plurality of comb teeth, or it may be fine that the lengths of the comb tooth electrodes are different. FIG. 17 is an example of the disposition of the pixels according to the embodiment in the case where a pixel electrode 112 is configured of a comb tooth electrode with two comb teeth. FIG. 17 is pixels in a three by three matrix. For easy understanding, only the comb tooth electrode of the pixel electrode 112 is depicted in the pixel, and the other configurations are omitted. When attention is paid for the pixel electrode 112 in the center pixel in FIG. 17, the bending directions of the pixel electrodes 112 of upper, lower, left, and right pixels adjacent to this pixel are in the opposite directions with respect to the bending direction of the pixel electrode 112 of the center pixel. Therefore, in the case where a voltage is applied to the pixel electrode 112, the rotation directions of the liquid crystal molecules 301 of the upper half and lower half of the pixel are opposite to the rotation directions of the liquid crystal molecules of the upper half and lower half of the upper, lower, left, and right pixels adjacent to the pixel. These situations are similarly applied to all of the other pixels as well as the center pixel in FIG. 17. In other words, since the rotation directions of the liquid crystal molecules 301 of the upper half and lower half of the pixel are opposite to each other for the individual adjacent pixels, a flow in a specific direction is not produced in the overall display region. Therefore, impurities such as ions included in the liquid crystal do not flow in a specific direction.

Figure 18:
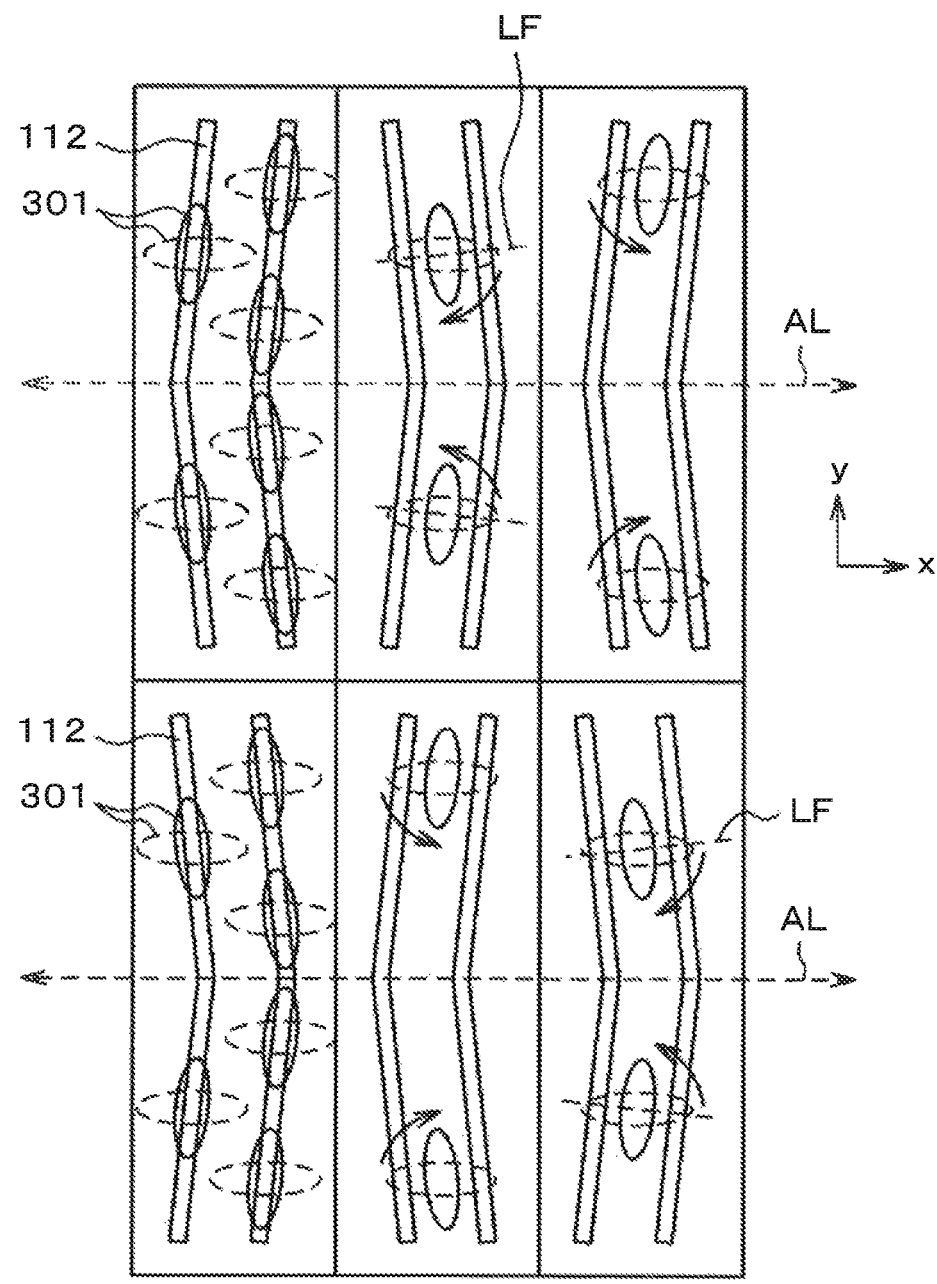
FIG. 18 is a schematic plane view of the operation according to the second embodiment.

FIG. 18 is a schematic plane view of the rotation direction of the liquid crystal molecules 301 corresponding to FIG. 17. The case in FIG. 18 is the case where the liquid crystal molecules 301 have a negative dielectric anisotropy. In FIG. 18, a dotted arrow AL expresses the alignment direction of the alignment film. The long axis of the liquid crystal molecules 301 depicted by a dotted line is initially aligned in the direction AL. When a voltage is applied to the pixel electrode 112, an electric field is directed in the direction of a dotted line denoted by LF, and the long axis of the liquid crystal molecules 301 is rotated in the direction at a right angle to LF. This is because the liquid crystal molecules 301 have a negative dielectric anisotropy.

In FIG. 18, the bending directions of the pixel electrodes 112 adjacent in the lateral direction are opposite with respect to the X-axis direction. Therefore, the rotation directions of the liquid crystal molecules of the upper half and lower half of the pixel in the case where a voltage is applied to the pixel electrode 112 are in the opposite directions to each other in the left and right adjacent pixels as depicted by arrows. Moreover, even in the upper and lower adjacent pixels, the rotation directions of the liquid crystal molecules of the upper half and lower half of the pixel are in the opposite directions to each other in the upper and lower adjacent pixels.

Therefore, in the case where the overall display region is considered, a flow of the liquid crystal, or a flow of ions, impurities, and the like included in the liquid crystal is not produced. As described above, also in the configuration according to the embodiment, it is possible to prevent a phenomenon in which impurities, ions, and the like included in the liquid crystal are accumulated on the peripheral portion of the display region or the corner portion of the display region to produce dark unevenness.

Third Embodiment

Figure 19:
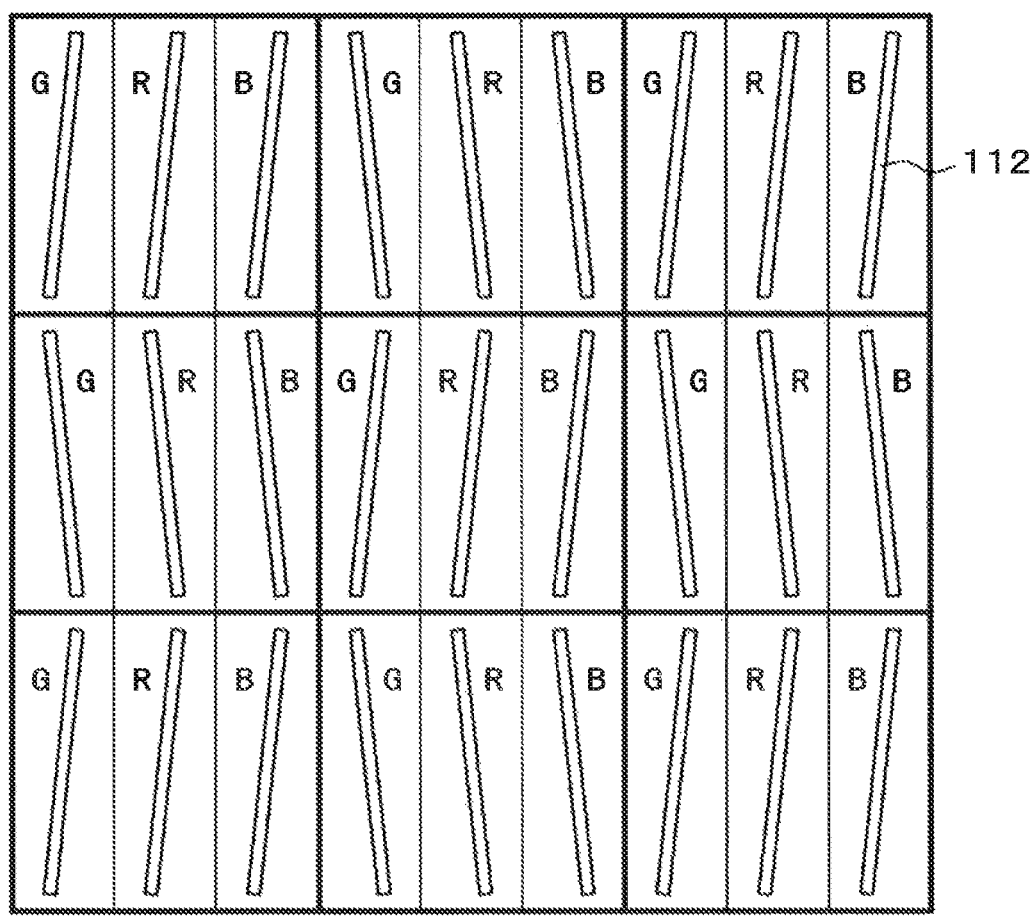
FIG. 19 is a plan view of the disposition of pixel electrodes according to a third embodiment.

FIG. 19 is a plan view of the disposition of pixels according to the embodiment. For a pixel electrode 112 in FIG. 19, the pixel electrodes 112 illustrated in FIGS. 2 and 3 in the first embodiment are used. R, G, and B in FIG. 19 denote a red pixel (R), a green pixel (G), and a blue pixel (B).

FIG. 19 is different from FIG. 4 in the first embodiment in that the orientations of the slopes of the pixel electrodes 112 are directed in the opposite directions for the individual pixels in FIG. 4, whereas in FIG. 19, in a set of the red pixel (R), the green pixel (G), and the blue pixel (B), the orientations of the slopes are directed in the same direction, and the slopes are opposite to one another for the individual sets of the pixel (R), the green pixel (G), and the blue pixel (B).

When the direction of the slope of the pixel electrode 112 is changed in the pixel set, this change sometimes causes color irregularities in the case where the screen is diagonally observed, so that the slopes of the pixel electrodes 112 are aligned to one another in the pixel set. Even though the pixel set is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Fourth Embodiment

Figure 20:
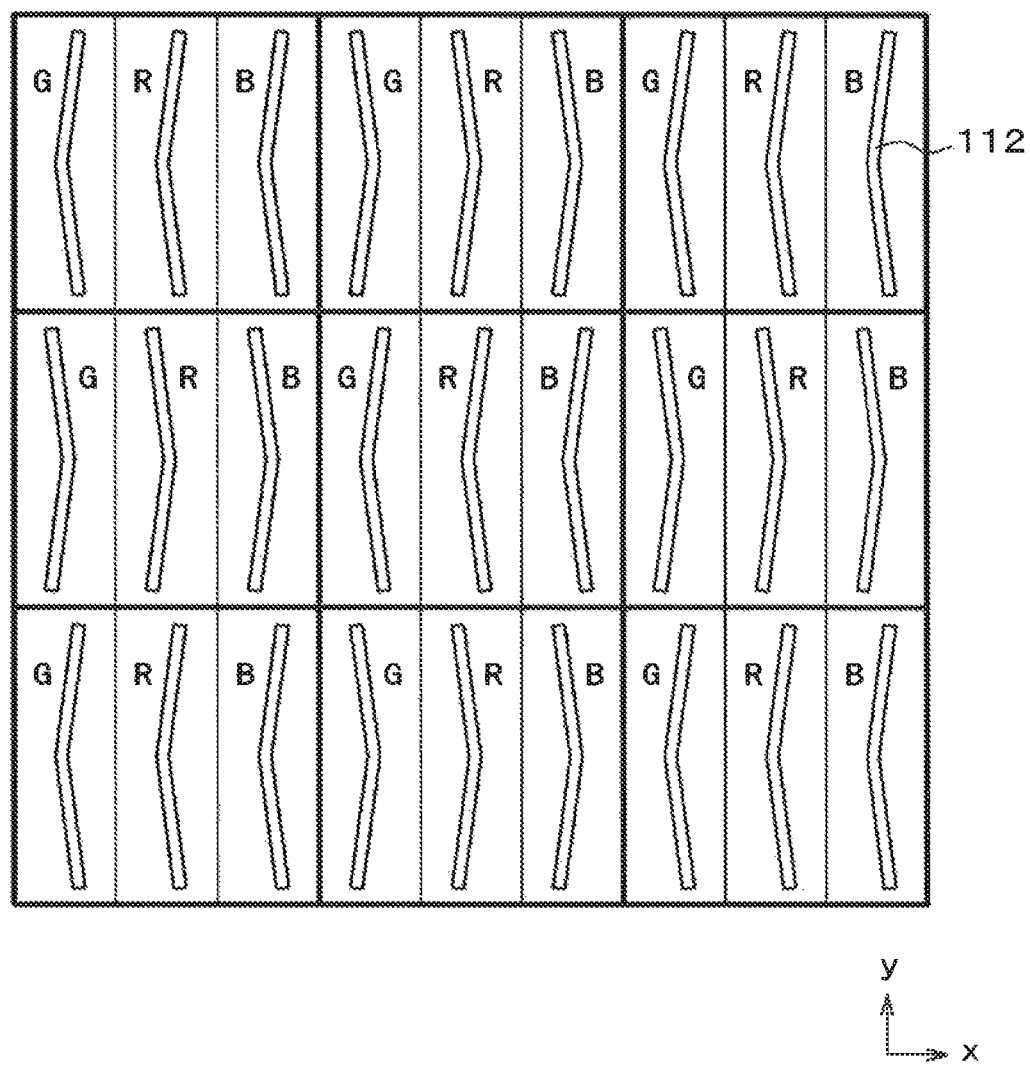
FIG. 20 is a plan view of the disposition of pixel electrodes according to a fourth embodiment.

FIG. 20 is a plan view of the disposition of pixels according to this embodiment. For a pixel electrode 112 in FIG. 20, the pixel electrodes 112 illustrated in FIGS. 13 and 14 in the second embodiment are used. R, G, and B in FIG. 20 denote a red pixel (R), a green pixel (G), and a blue pixel (B).

FIG. 20 is different from FIG. 17 in the second embodiment in that the bending directions of the pixel electrodes 112 are in the opposite directions for the individual pixels in FIG. 17, whereas in FIG. 20, in a set of the red pixel (R), the green pixel (G), and the blue pixel (B), the bending orientations are directed in the same direction, and the bending directions are opposite to one another for the individual sets of the pixel (R), the green pixel (G), and the blue pixel (B).

When the bending direction of the pixel electrode 112 is changed in the pixel set, this change sometimes causes color irregularities in the case where the screen is diagonally observed, so that the bending directions of the pixel electrodes are aligned to one another in the pixel set. Even though the pixel set is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Fifth Embodiment

Figure 21:
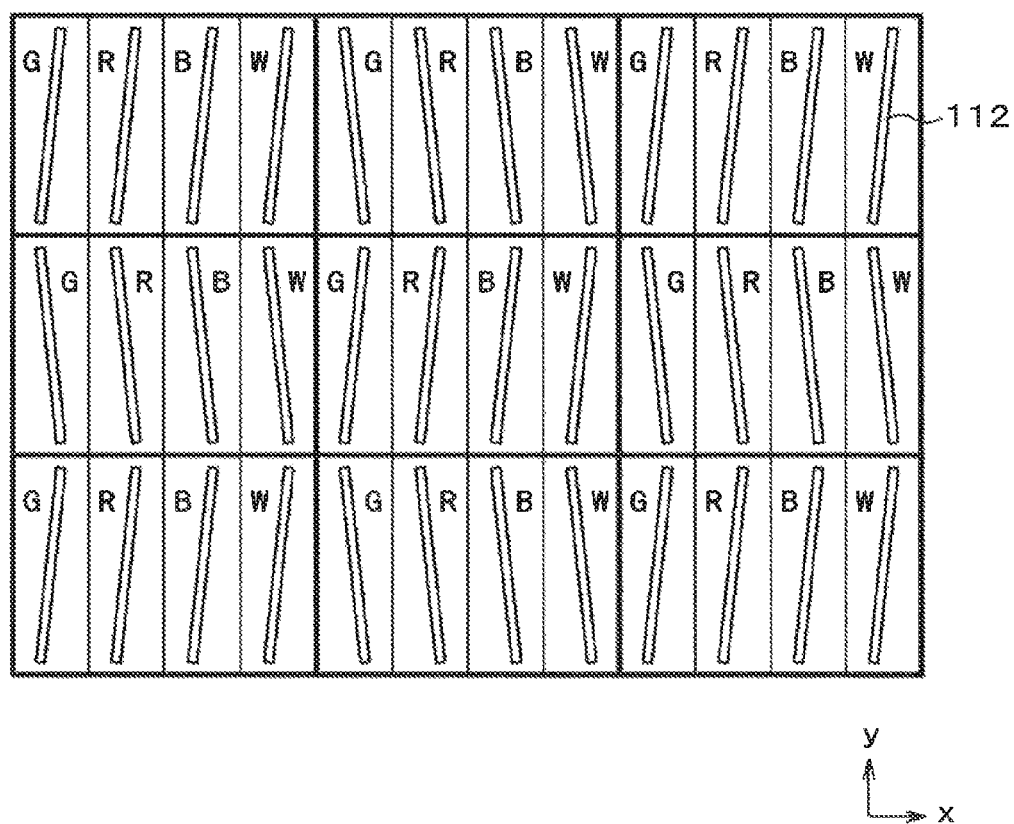
FIG. 21 is a plan view of the disposition of pixel electrodes according to a fifth embodiment.

FIG. 21 is a plan view of the disposition of pixels according to this embodiment. For a pixel electrode 112 in FIG. 21, the pixel electrodes 112 illustrated in FIGS. 2 and 3 in the first embodiment are used. R, G, B, and W in FIG. 21 denote a red pixel (R), a green pixel (G), a blue pixel (B), and a white pixel (W). The white pixel (W) is used for improving the transmittance of the screen.

FIG. 21 is different from FIG. 4 in the first embodiment in that the orientations of the slopes of the pixel electrodes 112 are directed in the opposite directions for the individual pixels in FIG. 4, whereas in FIG. 21, the orientation of the slope is directed in the same direction in a set of the red pixel (R), the green pixel (G), the blue pixel (B), and the white pixel (W), and the slopes are opposite to one another for a set of the pixel (R), the green pixel (G), the blue pixel (B), the white pixel (W).

When the direction of the slope of the pixel electrode 112 is changed in the pixel set, this change sometimes causes color irregularities in the case where the screen is diagonally observed, so that the slopes of the pixel electrodes are aligned to one another in the pixel set. Even though the pixel set is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Sixth Embodiment

Figure 22:
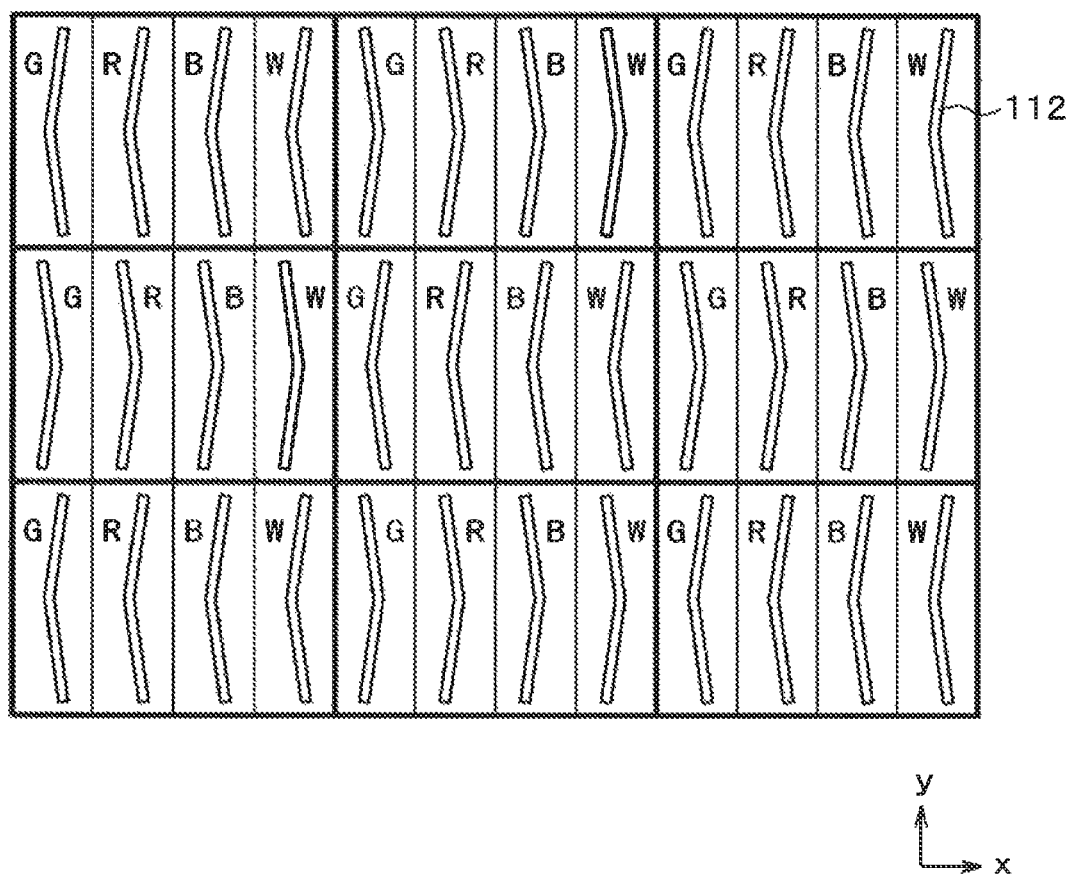
FIG. 22 is a plan view of the disposition of pixel electrodes according to a sixth embodiment.

FIG. 22 is a plan view of the disposition of pixels according to this embodiment. For a pixel electrode 112 in FIG. 22, the pixel electrodes 112 illustrated in FIGS. 13 and 14 in the second embodiment are used. R, G, and B in FIG. 22 denote a red pixel (R), a green pixel (G), a blue pixel (B), and a white pixel (W).

FIG. 22 is different from FIG. 17 in the second embodiment in that in the bending directions of the pixel electrodes 112 are in the opposite directions for the individual pixels in FIG. 17, whereas in FIG. 22, the bending orientation is directed in the same direction in a set of the red pixel (R), the green pixel (G), the blue pixel (B), and the white pixel (W), and the bending directions are opposite to one another for a set of the pixel (R), the green pixel (G), the blue pixel (B), the white pixel (W).

When the bending direction of the pixel electrode 112 is changed in the pixel set, this change sometimes causes color irregularities in the case where the screen is diagonally observed, so that the bending directions of the pixel electrodes are aligned to one another in the pixel set. Even though the pixel set is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Seventh Embodiment

Figure 23:
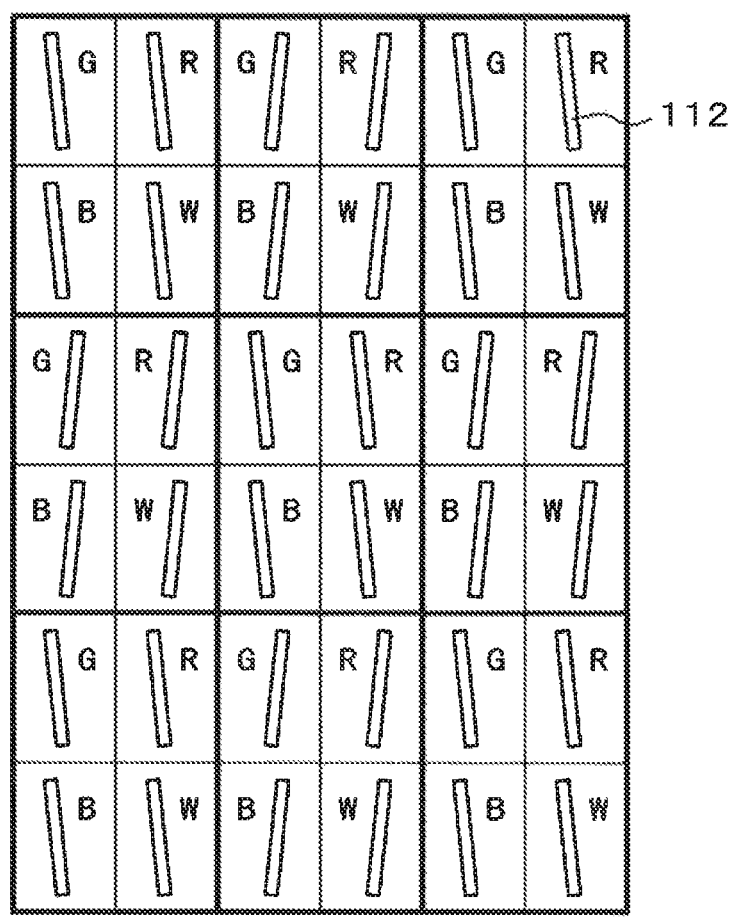
FIG. 23 is a plan view of the disposition of pixel electrodes according to a seventh embodiment.

FIG. 23 is a plan view of the disposition of pixels according to this embodiment. For a pixel electrode 112 in FIG. 23, the pixel electrodes 112 illustrated in FIGS. 2 and 3 in the first embodiment are used. R, G, B, and W in FIG. 23 denote a red pixel (R), a green pixel (G), a blue pixel (B), and a white pixel (W). The white pixel (W) is used for improving the transmittance of the screen.

Also in the embodiment, the configuration is similar to the fifth embodiment in which the orientation of the slope of the pixel electrode 112 is the same in a set of the red pixel (R), the green pixel (G), the blue pixel (B), and the white pixel (W) and the orientation is directed in the opposite directions for a set of the red pixel (R), the green pixel (G), the blue pixel (B), and the white pixel (W), but the disposition of the pixels are different in the pixel set. In other words, in the fifth embodiment, four pixels are arranged in the lateral direction, whereas in the embodiment, four pixels are arranged in such a manner that two pixels are arranged on the top and the bottom and two pixels are arranged on the left and the right. This is because this disposition sometimes decreases the occurrence of color irregularities.

Even though the pixel set in this disposition is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Eighth Embodiment

Figure 24:
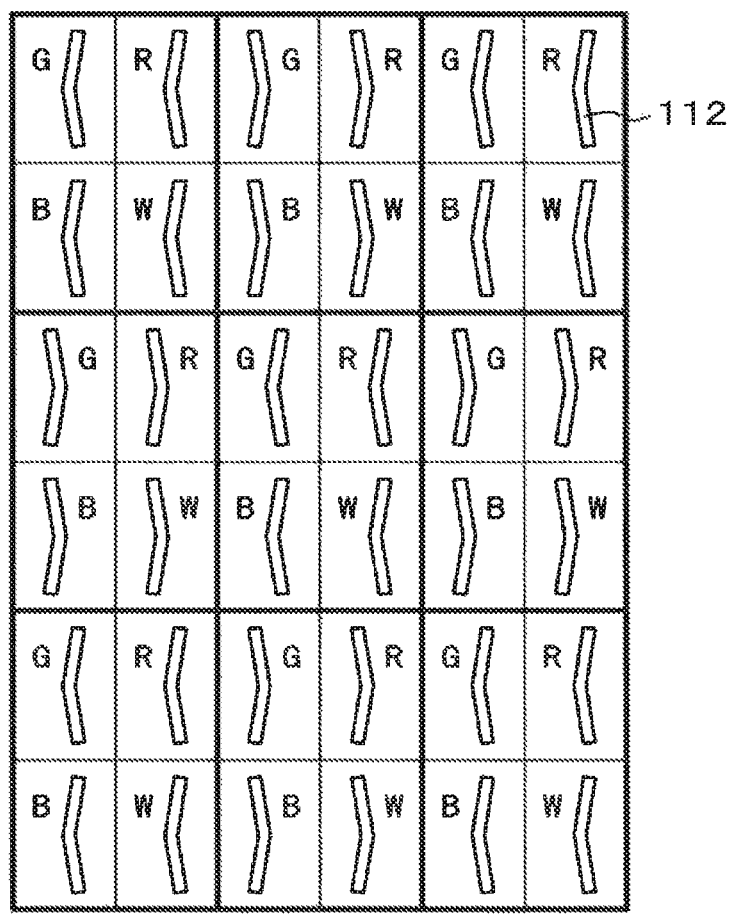
FIG. 24 is a plan view of the disposition of pixel electrodes according to an eighth embodiment.

FIG. 24 is a plan view of the disposition of pixels according to this embodiment. For a pixel electrode 112 in FIG. 24, the pixel electrodes 112 illustrated in FIGS. 13 and 14 in the second embodiment are used. R, G, and B in FIG. 24 denote a red pixel (R), a green pixel (G), a blue pixel (B), and a white pixel (W).

FIG. 24 is different from FIG. 22 in the sixth embodiment in that in FIG. 22, the red pixel (R), the green pixel (G), the blue pixel (B), and the white pixel (W) are arranged in the lateral direction, whereas in FIG. 24, in the embodiment, four pixels are arranged in such a manner that two pixels are arranged on the top and the bottom and two pixels are arranged on the left and the right. This is because this disposition sometimes decreases the occurrence of color irregularities.

Even though the pixel set in this disposition is provided, the area is sufficiently small in the consideration of the overall display region, so that it is possible to prevent a phenomenon in which the liquid crystal, or impurities, ions, and the like included in the liquid crystal flow in a certain direction and dark unevenness is produced on the corner portion and the like of the display region.

Ninth Embodiment

Figure 25:
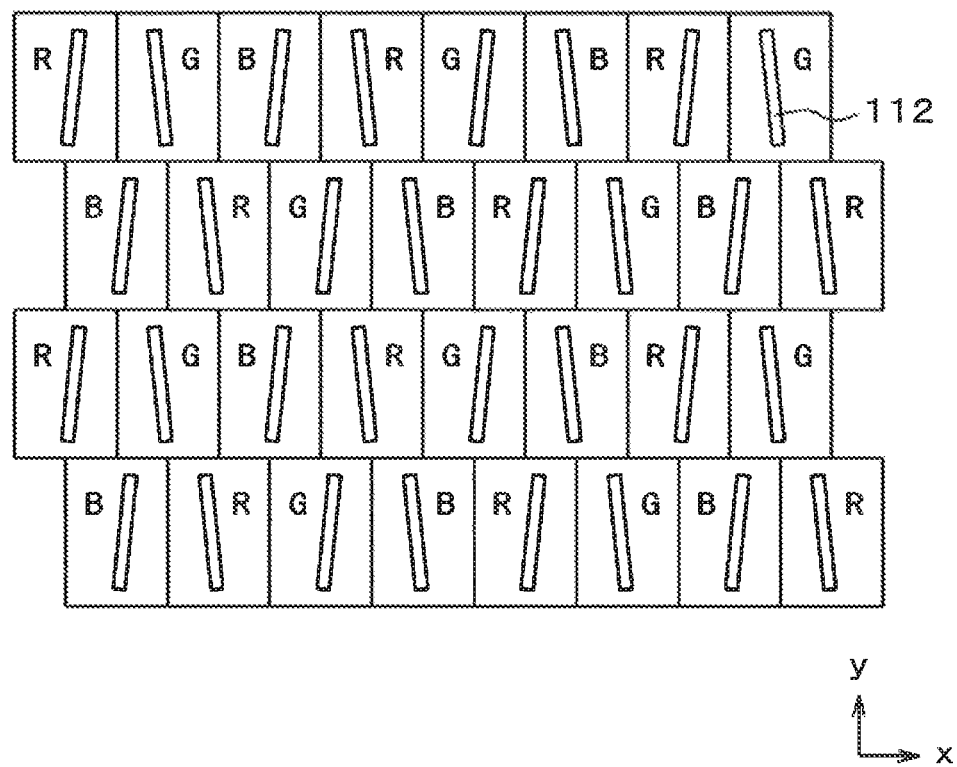
FIG. 25 is a plan view of the disposition of pixel electrodes according to a ninth embodiment.

FIG. 25 is a plan view of the disposition of pixels according to this embodiment. For a pixel electrode 112 in FIG. 25, the pixel electrodes 112 illustrated in FIGS. 2 and 3 in the first embodiment are used. R, G, and B in FIG. 25 denote a red pixel (R), a green pixel (G), and a blue pixel (B).

FIG. 25 is different from FIG. 4 in the first embodiment in that the red pixel (R), the green pixel (G), the blue pixel (B) are in a delta disposition in the embodiment. In FIG. 25, in the pixels laterally adjacent to each other, the orientations of the slope of the pixel electrodes are in the opposite directions. Since the pixels are in the delta disposition in FIG. 25, the pixels are displaced in the lateral direction at a half of the pixel pitch in each row. The other points are similar to the first embodiment.

Even though the pixels are disposed as illustrated in FIG. 25, it is possible to prevent a phenomenon in which the liquid crystal, or impurities, ions, and the like included in the liquid crystal flow in a certain direction and dark unevenness is produced on the corner portion and the like of the display region.

The description of the embodiment above follows the pixel electrodes 112 illustrated in FIGS. 2, 3, 7, and 8 in the first embodiment. The embodiment is also similarly applicable to the cases of the bent pixel electrodes 112 as illustrated in FIGS. 13 to 16 in the second embodiment.

Tenth Embodiment

In the first to the ninth embodiments, the present disclosure is described in the case of a so-called structure that a pixel electrode is provided on the top side in which the pixel electrode 112 is provided above the common electrode 110. However, the present disclosure is also applicable to the case of a so-called structure that a common electrode is provided on the top side in which the common electrode 110 is provided above the pixel electrode 112.

Figure 26:
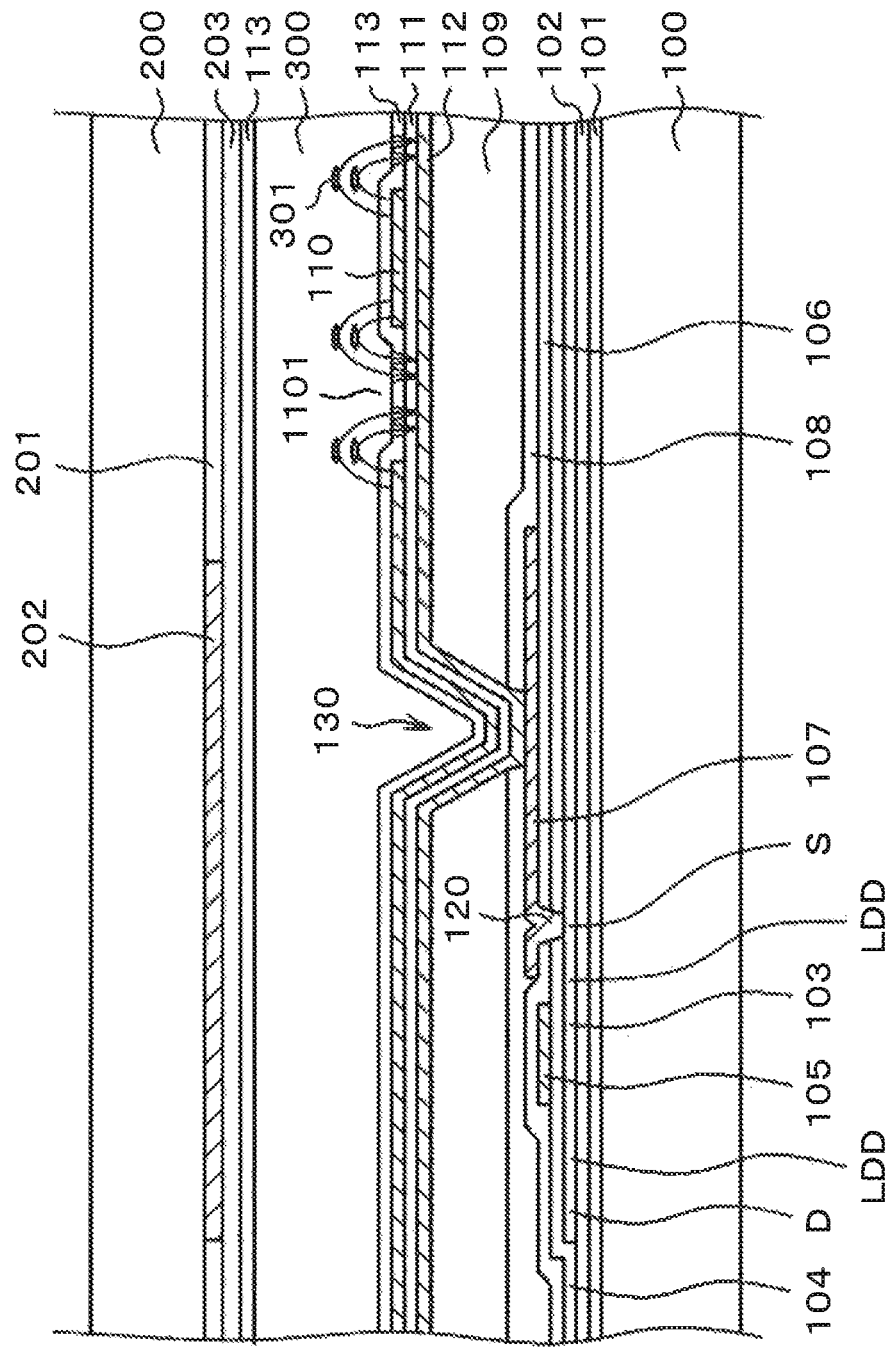
FIG. 26 is a cross sectional view of a liquid crystal display device in the IPS mode in which a common electrode is provided on the top side.

FIG. 26 is a cross sectional view of the structure in which the common electrode is provided on the top side. FIG. 26 is different from FIG. 1 in that a pixel electrode 112 is formed in a flat surface in a pixel, a common electrode 110 is formed solidly on the flat surface through a second interlayer insulating film 111, and a slit 1101 is formed on the common electrode 110. When a voltage is applied to the pixel electrode 112 through a TFT, an electric line of force is extended from the common electrode 110 to the pixel electrode 112 through the slit 1101 of the common electrode. This electric field rotates the liquid crystal. The other configurations are similar to FIG. 1, and the description is omitted.

Figure 27:
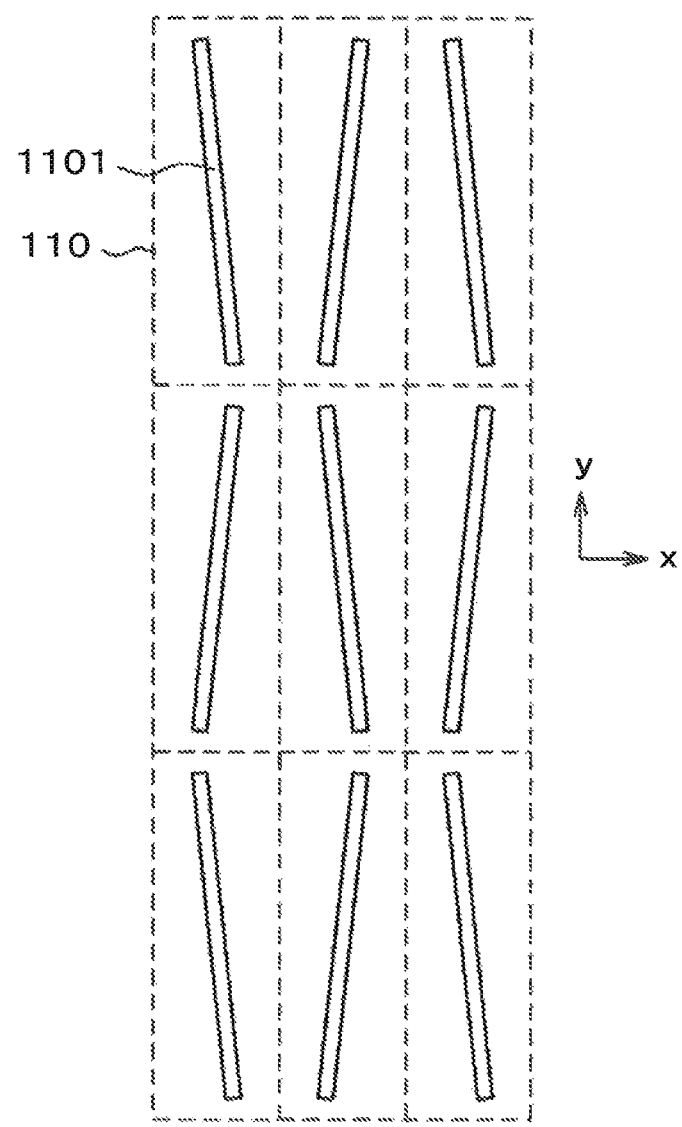
FIG. 27 is a plan view of the disposition of pixel electrodes according to a tenth embodiment.
Figure 28:
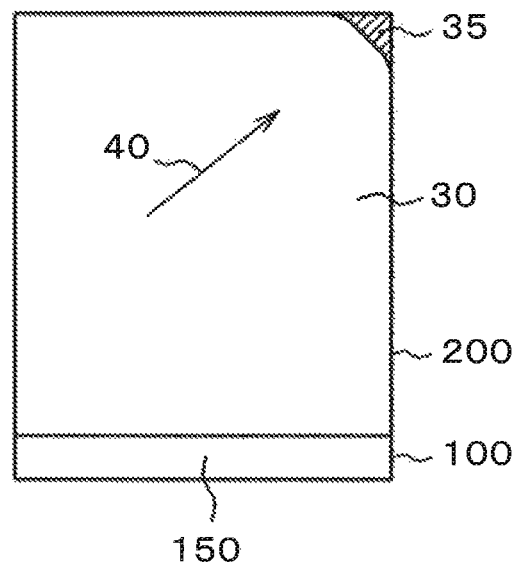
FIG. 28 is a plan view of the production of dark unevenness.
Figure 29:
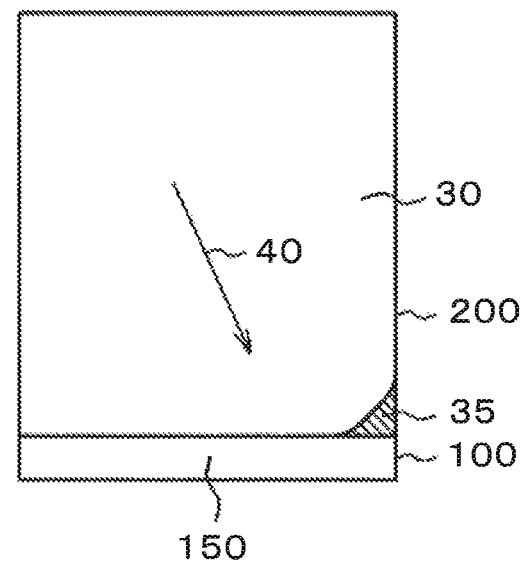
FIG. 29 is another plan view of the production of dark unevenness.

FIG. 27 is a plan view of the embodiment of the present disclosure in the case where the common electrode is provided on the top side. In FIG. 27, the common electrode 112 is formed in common in the pixels. In FIG. 27, the boundary of the pixels is depicted by a dotted line. In the pixel, the slit 1101 is formed on the common electrode 110. This slit 1101 is formed to tilt in the Y-direction. The orientations of the slopes of the slits 1101 are in the opposite directions in top, bottom, left, and right adjacent pixels.

With this configuration, it is possible to prevent a phenomenon in which the liquid crystal, or impurities, ions, and the like included in the liquid crystal flow in a certain direction and dark unevenness is produced on the corner portion and the like of the display region similarly to the description in the first embodiment.

FIG. 27 is an example corresponding to the first embodiment. However, also in the case where the common electrode is provided on the top side, the effect similar to the second to the ninth embodiments can be obtained by replacing the pixel electrodes 112 described in the second to the ninth embodiments by the slit 1101 of the common electrode.

What is claimed is:

1. A liquid crystal display device comprising:
   a TFT substrate including a scanning line extended in a first direction and arrayed in a second direction at a right angle to the first direction, a picture signal line extended in the second direction and arrayed in the first direction, and a pixel formed between the scanning line and the picture signal line;
   a counter substrate; and
   a liquid crystal sandwiched between the TFT substrate and the counter substrate,
   wherein a first pixel is formed with a pixel electrode bent in a projection in the first direction; and
   pixel electrodes of top, bottom, left, and right adjacent pixels to the first pixel are formed with a pixel electrode bent in a projection in a direction opposite to the first direction.

2. A liquid crystal display device comprising:
   a TFT substrate including a scanning line extended in a first direction and arrayed in a second direction at a right angle to the first direction, a picture signal line extended in the second direction and arrayed in the first direction, and a pixel formed between the scanning line and the picture signal line;
   a counter substrate; and
   a liquid crystal sandwiched between the TFT substrate and the counter substrate,
   wherein a first pixel set is formed of a plurality of pixels having a pixel electrode at a first angle in the second direction; and
   a set of top, bottom, left, and right adjacent pixels to the first pixel set is formed of a plurality of pixels having a pixel electrode at a second angle in the second direction, an absolute value of the first angle is equal to an absolute value of the second angle, and a sign of the first angle is opposite to a sign of the second angle.

3. The liquid crystal display device according to claim 2, wherein the pixel set is configured of three pixels adjacent in a lateral direction.

4. The liquid crystal display device according to claim 2, wherein the pixel set is configured of four pixels adjacent in a lateral direction.

5. The liquid crystal display device according to claim 2, wherein the pixel set is configured of four pixels adjacent in top, bottom, left, and right directions.

6. A liquid crystal display device comprising:
- a TFT substrate including a scanning line extended in a first direction and arrayed in a second direction at a right angle to the first direction, a picture signal line extended in the second direction and arrayed in the first direction, and a pixel formed between the scanning line and the picture signal line;
- a counter substrate; and
- a liquid crystal sandwiched between the TFT substrate and the counter substrate,
- wherein: a first pixel set is formed of a plurality of pixels having a pixel electrode bent in a projection in the first direction; and
- a set of top, bottom, left, and right adjacent pixels to the first pixel set is formed of a plurality of pixels having a pixel electrode bent in a projection in a direction opposite to the first direction.

7. The liquid crystal display device according to claim 6, wherein the pixel set is configured of three pixels adjacent in a lateral direction.

8. The liquid crystal display device according to claim 6, wherein the pixel set is configured of four pixels adjacent in a lateral direction.

9. The liquid crystal display device according to claim 6, wherein the pixel set is configured of four pixels adjacent in top, bottom, left, and right directions.

* * * * *